(12) United States Patent
Akiba et al.

(10) Patent No.: US 7,238,461 B2
(45) Date of Patent: Jul. 3, 2007

(54) OPTICAL INFORMATION-RECORDING MEDIUM, NOVEL OXONOL COMPOUND AND METHOD OF RECORDING INFORMATION

(75) Inventors: Masaharu Akiba, Kanagawa (JP); Shin-ichi Morishima, Kanagawa (JP); Yoshio Inagaki, Kanagawa (JP); Hisashi Mikoshiba, Kanagawa (JP); Michihiro Shibata, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 416 days.

(21) Appl. No.: 10/724,353

(22) Filed: Dec. 1, 2003

(65) Prior Publication Data

US 2004/0166441 A1 Aug. 26, 2004

(30) Foreign Application Priority Data

Nov. 29, 2002 (JP) ............................ P2002-348143
Nov. 17, 2003 (JP) ............................ P2003-386222

(51) Int. Cl.
*G11B 7/24* (2006.01)
*C07D 319/16* (2006.01)

(52) U.S. Cl. ................ 430/270.18; 430/945; 428/64.8; 369/288; 549/274

(58) Field of Classification Search ..................... None
See application file for complete search history.

(56) References Cited

U.S. PATENT DOCUMENTS

| 2,425,772 | A | * | 8/1947 | Wilson ....................... 540/471 |
| 2,461,137 | A | * | 2/1949 | Brooker ....................... 430/579 |
| 3,867,146 | A | * | 2/1975 | Nakazawa et al. ............. 430/1 |
| 4,581,317 | A | | 4/1986 | Simmons, III |
| 4,619,990 | A | | 10/1986 | Elmasry |
| 4,666,819 | A | * | 5/1987 | Elmasry ................ 430/270.14 |
| 4,680,375 | A | | 7/1987 | Elmasry |
| 4,968,593 | A | | 11/1990 | Inagaki et al. |
| 5,002,812 | A | * | 3/1991 | Umehara et al. ........... 428/64.9 |
| 5,384,221 | A | * | 1/1995 | Savant et al. ................. 430/19 |
| 5,786,123 | A | | 7/1998 | Burns et al. |
| 5,879,772 | A | * | 3/1999 | Morishima et al. ........ 428/64.1 |
| 6,225,024 | B1 | | 5/2001 | Morishima et al. |
| 6,432,625 | B1 | * | 8/2002 | Verbeeck et al. ........... 430/445 |
| 2005/0063292 | A1 | * | 3/2005 | Shibata .................... 369/275.4 |
| 2006/0286338 | A1 | * | 12/2006 | Akiba et al. ................ 428/64.4 |
| 2007/0020562 | A1 | * | 1/2007 | Akiba et al. ........... 430/270.18 |

FOREIGN PATENT DOCUMENTS

| EP | 1 239 467 A1 | | 9/2002 |
| JP | 10-226170 A | | 8/1998 |
| JP | 11-058973 | * | 3/1999 |
| JP | 2001-287456 A | | 10/2001 |

OTHER PUBLICATIONS

Hamer "The cyanine dyes and related compounds" (c) 1964 pp. 668-681.*
European Search Report dated Dec. 23, 2004.

* cited by examiner

*Primary Examiner*—Martin Angebranndt
(74) *Attorney, Agent, or Firm*—Sugrue Mion, PLLC

(57) ABSTRACT

An optical information-recording medium which contains a dye having at least two chromophores bonded to each other without any conjugated bond intervening between those chromophores.

7 Claims, 1 Drawing Sheet

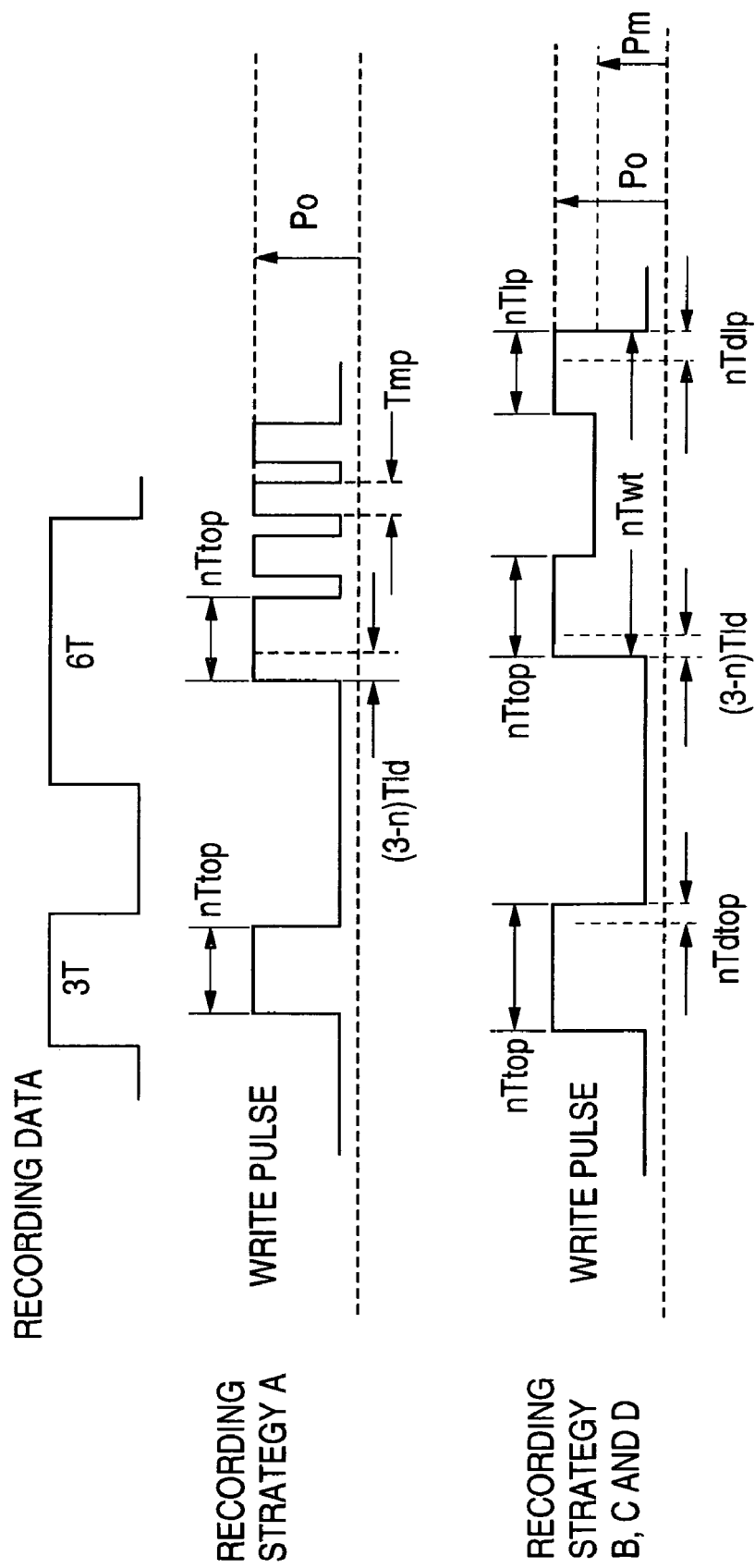

OPTICAL INFORMATION-RECORDING MEDIUM, NOVEL OXONOL COMPOUND AND METHOD OF RECORDING INFORMATION

BACKGROUND OF THE INVENTION

1. Field of the Invention

The present invention relates to a heat-mode information recording medium and an information recording method which enable write (record) and read (playback) of information by use of high energy density laser light. More specifically, the invention relates to a heat-mode information recording medium, such as a recordable digital versatile disc (DVD-R), which is suitable for recording information by use of visible laser light.

2. Description of the Related Art

Information recording media on which information is recordable only once by use of laser light (optical discs) have been long known. The information recording media of such a type are referred to as recordable CDs (the so-called CD-R) as well. These discs have an advantage in that they can be rapidly delivered in low quantities at reasonable prices, compared with traditional CDs, and the demand for them has been growing as personal computers have come into widespread use recently. A typical structure of CD-R type of information recording media is a laminate in which a transparent disk-shape substrate, a recording layer containing organic dyes, a reflective layer made of metal such as gold and a protective layer made of resin are arranged in the order of mention.

And such optical discs can have information recorded thereon by being irradiated with laser light in the near infrared region (generally laser light of wavelengths in the vicinity of 780 nm) and undergoing local heat generation and deformation in their respective recording layers. On the other hand, reading (playback) of information from discs is generally performed by irradiating the discs with laser light of the same wavelength as the laser light used for recording has, and detecting differences in reflectivities between the areas deformed by heat generation (recorded area) and the areas remaining undeformed (unrecorded area) in the recording layers.

In recent years information recording media have been required to have higher recording densities. In order to heighten the recording densities, it is known to be effective that the diameter of laser light used for irradiation is narrowed down. Moreover, irradiation with laser light of shorter wavelengths is known to be theoretically more advantageous to further increase in recording density, because the diameter of laser light can be made more narrow the shorter the laser light is in wavelength. Therefore, the development of optical discs suitable for record and playback with laser light of wavelengths shorter than hither to used 780 nm has been pursued. For instance, optical discs referred to as recordable digital video discs (the so-called DVD-R) have been offered. These optical discs are each manufactured so as to have a structure that two disks which each have on a 120-mm-dia or 80-mm-dia transparent disk-shape substrate, wherein is formed a pregroove having a 0.8-µm track pitch smaller than 1.6 µm adopted as the track pitch of CD-R, a dye-containing recording layer, a reflective layer and a protective layer in the order of mention are bonded together with the recording layers inside, or one disk as described above and a disk-shape protective substrate having almost the same dimensions are bonded together with the recording layer inside. And the record and the playback of DVD-R are performed by irradiation with visible laser light (generally in the wavelength range of 600 to 700 nm). Therefore, DVD-R is considered to enable high-density recording, compared with CD-R type of optical discs.

As the information recording medium of DVD-R type can record information several times as much as that of a hitherto used information recording medium of CD-R type, it is desired that the information recording medium of DVD-R type has not only high recording sensitivity but also a low incidence of errors even in high-speed recording made out of necessity to process rapidly high-volume information in particular. In addition, it is desired to develop a recording layer capable of retaining its properties with stability for a long time even under exposure to light or heat, because a dye-containing recording layer is generally not so stable to prolonged exposure to heat or light.

JP-A-10-226170 discloses the DVD-R type of information recording medium having on a substrate a recording layer containing a certain cyanine dye. Therein, it is stated that the cyanine dye compound as specified can ensure high recording sensitivity and high reflectivity in the information recording medium. Further, JP-A-2001-287456 discloses the information recording medium having on a substrate a recording layer containing a cyanine dye of a specific structure, and states that such a cyanine dye enables the recording medium to have excellent recording characteristics and retain its recording characteristics with stability for a long time. On the other hand, JP-A-63-209995 discloses the CD-R type of information recording medium having an oxonol dye-containing recording layer provided on a substrate, and states that the use of such a dye compound enables long-term retention of steady record and playback characteristics. Therein, the oxonol dye compounds having ammonium ions introduced therein for forming salts are disclosed. In addition, JP-A-2000-52658 discloses the oxonol dye compounds providing optical information-recording media with high light resistance and durability as well as excellent recording characteristics.

SUMMARY OF THE INVENTION

The present Inventors used various cyanine dye compounds and oxonol dye compounds as disclosed in the documents cited above in optical information-recording media of DVD-R type and studied performance capabilities of the resulting recording media. As a result, it has been found that while the DVD-R type of optical information-recording media containing those dye compounds in their respective recording layers showed very excellent recording characteristics in the low-speed recording at equivalent or double speed, they fell short of delivering practically sufficient performances in respects of modulation factor and reflectivity although they can show comparatively excellent recording characteristics at the time of high-speed recording at quadruple or higher speed. The use of a dye having an optical characteristic that the complex refractive index (n+ik) of the dye is greater in the real part n than those of dyes for low-speed recording use and its imaginary part k is almost the same as or smaller than those of dyes for low-speed recording use can serve the purpose of obtaining an optical information-recording medium which can maintain satisfactory recording characteristics in the recording at a low speed such as an equivalent or double speed and, at the same time, can satisfy recording performances, including sufficient reflectivity and modulation factor in particular, even in the recording at a high speed such as a quadruple or higher speed. However, it was very difficult to obtain dyes showing complex refractive indexes great in real part n and almost equal or small in imaginary part k, compared with those of dyes for low-speed recording use, while maintaining satisfactory low-speed recording characteristics. Therefore, an object of the invention is to provide a dye having a complex refractive index great in real part n and almost equal or small in imaginary part k, compared with those of dyes for low-speed recording use, and thereby ensuring a high reflectivity and a high modulation factor even in high-speed recording at quadruple or higher speed as it maintains satisfactory recording characteristics in low-speed recording at equivalent to double speed. Another object of the invention is to provide a dye attaining sufficiently low jitter at a wide range of recording speeds covering from equivalent- to octuple-speed recording.

As a result of our intensive studies, it has been found that the desired optical characteristics as mentioned above can be achieved by imparting the following specific molecular structures to dyes.

The following are embodiments of the invention:

(1) An optical information-recording medium, comprising a dye having at least two chromophores that are bonded to each other without any conjugated bond intervening between the chromophores (preferably in a recording layer). The optical information-recording medium is preferably a heat-mode optical information-recording medium having on a substrate a recording layer capable of recording information by irradiation with laser light.

(2) A heat-mode optical information-recording medium as described in (1), having a thickness of 1.2±0.2 mm and comprising two laminates each containing a recording layer including the dye, in which the two laminates are bonded each other so that each of the recording layers is inside, each other so that the recording layer is inside, wherein the laminate includes a transparent disk-shape substrate having a pregroove formed with a track pitch of 0.6 to 0.9 μm and measuring one of 120±3 mm and 80±3 mm in diameter and 0.6±0.1 mm in thickness; and the recording layer provided on the pregroove-formed side of the transparent disk-shape substrate.

(3) An optical information-recording medium as described in (1) or (2), wherein the dye is represented by the following formula (1):

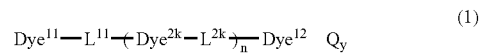

wherein $Dye^{11}$, $Dye^{12}$ and $Dye^{2K}$ each independently represents a dye residue having a chromophore, $L^{11}$ and $L^{2k}$ each independently represent a divalent linkage group forming no π-conjugated system between chromophores linked thereby, n represents an integer of 0 to 10, k represents every integer in the 0 to n range, Q represents an ion neutralizing electric charge, and y is a number required for neutralization of electric charge.

(4) An optical information-recording medium as described in (3), wherein the chromophore forming the dye residue represented by any of $Dye^{11}$, $Dye^{12}$ and $Dye^{2k}$ is at least one of cyanine dyes, merocyanine dyes and oxonol dyes.

(5) An optical information-recording medium as described in (3) or (4), wherein all the chromophores forming the dye residues represented by $Dye^{11}$, $Dye^{12}$ and $Dye^{2k}$ are oxonol dyes.

(6) An optical information-recording medium as described in any of (1) to (5), wherein the dye is of a structure represented by the following formula (6):

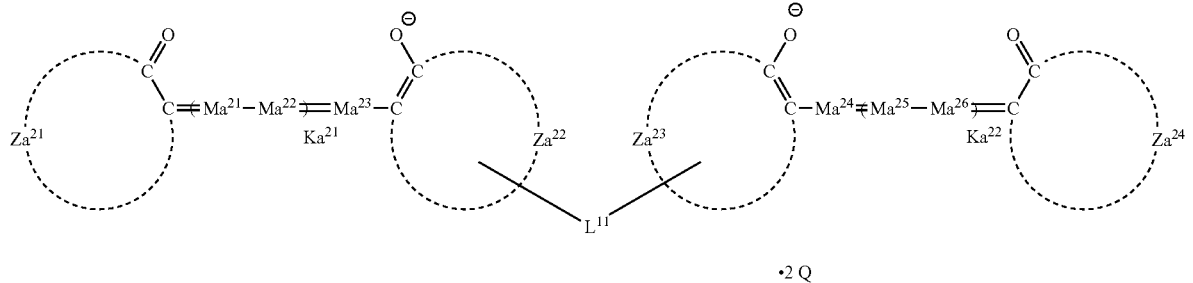

wherein each of the laminates includes a transparent disk-shape substrate having a pregroove formed with a track pitch of 0.6 to 0.9 μm and measuring one of 120±3 mm and 80±3 mm in diameter and 0.6±0.1 mm in thickness; and the recording layer provided on the pregroove-formed side of the transparent disk-shape substrate; or a heat-mode optical information-recording medium as described in (1), having a thickness of 1.2±0.2 mm, the optical information-recording medium comprising a laminate containing a recording layer including the dye and a disk-shape protective plate, in which the laminate and the disk-shape protective plate are bonded wherein $Za^{21}$, $Za^{22}$, $Za^{23}$ and $Za^{24}$ each independently represents atoms forming an acidic nucleus, $Ma^{21}$, $Ma^{22}$, $Ma^{23}$, $Ma^{24}$, $Ma^{25}$ and $Ma^{26}$ each represent a substituted or unsubstituted methine group independently, $L^{11}$ is a divalent linkage group forming no π-conjugated system together with its two bonds, $Ka^{21}$ and $Ka^{22}$ each represent an integer of 0 to 3 independently, and Q represents a univalent cation for neutralizing electric charge or 2Q represents a divalent cation; and $Ma^{21}$s, $Ma^{22}$s, $Ma^{25}$s and $Ma^{26}$s present when $Ka^{21}$ and $Ka^{22}$ are each 2 or 3 may be the same or different.

(7) An oxonol compound represented by the following formula (2):

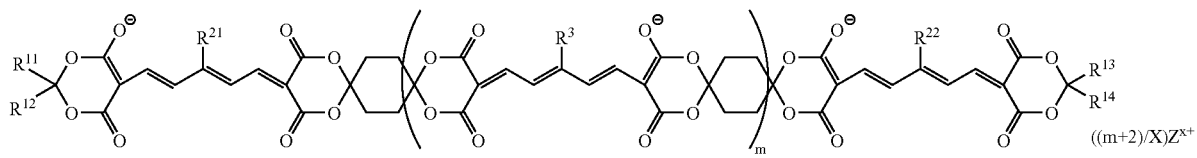

(2)

wherein $R^{11}$, $R^{12}$, $R^{13}$ and $R^{14}$ each independently represents a hydrogen atom, a substituted or unsubstituted alkyl group, a substituted or unsubstituted aryl group or a substituted or unsubstituted heterocyclic group, $R^{21}$, $R^{22}$ and $R^3$ each independently represents a hydrogen atom, a substituted or unsubstituted alkyl group, a substituted or unsubstituted alkoxy group, a substituted or unsubstituted aryl group, a substituted or unsubstituted aryloxy group, a substituted or unsubstituted heterocyclic group, a halogen atom, a carboxyl group, a substituted or unsubstituted alkoxycarbonyl group, a cyano group, a substituted or unsubstituted acyl group, a substituted or unsubstituted carbamoyl group, an amino group, a substituted amino group, a sulfo group, a hydroxyl group, a nitro group, a substituted or unsubstituted alkylsulfonylamino group, a substituted or unsubstituted arylsulfonylamino group, a substituted or unsubstituted carbamoylamino group, a substituted or unsubstituted alkylsulfonyl group, a substituted or unsubstituted arylsulfonyl group, a substituted or unsubstituted alkylsulfinyl group, a substituted or unsubstituted arylsulfinyl group or a substituted or unsubstituted sulfamoyl group, m represents an integer of 0 or more, $R^3$s may be the same or different when m is 2 or more, $Z^{x+}$ represents a cation, and x represents an integer of 1 or more.

(8) An optical information-recording medium as described in any of (1) to (6), wherein the dye is an oxonol compound represented by formula (2) defined in (7).

(9) A method of recording information comprising recording information on an optical information-recording medium as described in any of (1) to (6) and (8) by irradiation with laser light having a wavelength of 600 to 700 nm.

BRIEF DESCRIPTION OF THE DRAWINGS

FIG. 1 is a diagram showing recording strategies used in Example and Comparative Examples.

DETAILED DESCRIPTION OF THE INVENTION

The invention is illustrated below in detail. Additionally, when a specific moiety is referred to as "a group" in the invention, the term "group" means that the moiety may have at least one (to the greatest possible number) substituent or no substituent unless otherwise indicated. For instance, the term "an alkyl group" is intended to include substituted and unsubstituted alkyl groups. Moreover, the substituents usable in the present compounds may include any substituents whether they further have substituents or not. And when a specific moiety is referred to as "a ring" or "a group" contains "a ring" in the invention, the "ring" may be a single ring or a condensed ring, or it may be substituted or unsubstituted, unless otherwise indicated. For instance, "an aryl group" may be a phenyl group, or a naphthyl group, or a substituted phenyl group.

In formula (1), $Dye^{11}$, $Dye^{12}$ and $Dye^{2k}$ each represent a dye residue having a chromophores independently. The chromophore forming the dye residue represented by $Dye^{11}$, $Dye^{12}$ and $Dye^{2k}$ each has no particular restrictions. Included among its examples are cyanine dyes, styryl dyes, merocyanine dyes, phthalocyanine dyes, oxonol dyes, azo dyes, azamethine dyes, squarylium dyes and metal chelate complex dyes. Suitable examples of chromophores forming dye residues forming $Dye^{11}$, $Dye^{12}$ and $Dye^{2k}$ include cyanine dyes, merocyanine dyes, oxonol dyes, phthalocyanine dyes, or metal chelate dyes. Of these dyes, cyanine dyes, merocyanine dyes or oxonol dyes, especially cyanine dyes or oxonol dyes, are preferred over the others as the chromophores forming dye residues represented by $Dye^{11}$, $Dye^{12}$ and $Dye^{2k}$. The chromophores forming dye residues represented by $Dye^{11}$, $Dye^{12}$ and $Dye^{2k}$ may be different from one another, but it is preferable that they are the same.

When the chromophores forming dye residues represented by $Dye^{11}$, $Dye12$ and $Dye^{2k}$ are cyanine dyes, the cyanine dyes are preferably those represented by the following formula (3):

(3)

$$Ra^1-\overset{\oplus}{N}\mathrel{\reflectbox{$\Rsh$}}(Ma^1-Ma^2\mathrel{\reflectbox{$\Rsh$}}\underset{na^1}{C}(Ma^3=Ma^4)_{ka^1}Ma^5=\underset{}{C}(Ma^6=Ma^7)_{na^2}N-Ra^2$$

$$Q_y$$

In the above formula, $Za^1$ and $Za^2$ each represent atoms forming a 5-or 6-membered nitrogen-containing heterocyclic ring which may further be fused together with a benzene ring, a benzofuran ring, a pyridine ring, a pyrrole ring, an indole ring or a thiophene ring.

$Ra^1$ and $Ra^2$ each represent any of a hydrogen atom, a substituted or unsubstituted alkyl group (preferably containing 1 to 20 carbon atoms, with examples including methyl, ethyl, n-propyl, isopropyl, n-butyl, n-pentyl, benzyl, 3-sulfopropyl, 4-sulfopropyl, 3-methyl-3-sulfopropyl, 2'-sulfobenzyl, carboxymethyl and 5-carboxypentyl groups), a substituted or unsubstituted alkenyl group (preferably containing 2 to 20 carbon atoms, with examples including vinyl and allyl groups), a substituted or unsubstituted aryl group (preferably containing 6 to 20 carbon atoms, with examples including phenyl, 2-chlorophenyl, 4-methoxyphenyl, 3-methylphenyl and 1-naphthyl groups) and a substituted or unsubstituted heterocyclic group (preferably containing 1 to 20 carbon atoms, with examples including pyridyl, thienyl, furyl, thiazolyl, imidazolyl, pyrazolyl, pyrrolidino and morpholino groups), preferably any of a hydrogen atom, a substituted or unsubstituted alkyl group and a substituted or unsubstituted sulfoalkyl group, far preferably either of a substituted or unsubstituted alkyl group or a substituted or unsubstituted sulfoalkyl group.

$Ma^1$ to $Ma^7$ each represent a methine group independently. The methine group may have a substituent. Suitable examples of such a substituent include a 1–20C alkyl group (e.g., methyl, ethyl, i-propyl), a halogen atom (e.g., chlorine, bromine, iodine, fluorine), a nitro group, a 1–20C alkoxy group (e.g., methoxy, ethoxy), a 6–26C aryl group (e.g., phenyl, 2-naphthyl), a 0–20C heterocyclic group (e.g., 2-pyridyl, 3-pyridyl), a 6–20C aryloxy group (e.g., phenoxy, 1-naphthoxy, 2-naphthoxy), a 1–20C acylamino group (e.g., acetylamino, benzoylamino), a 1–20C carbamoyl group (e.g., N,N-dimethylcarbamoyl), a sulfo group, a hydroxyl group, a carboxyl group, a 1–20C alkylthio group (e.g., methylthio) and a cyano group. In addition, the methine group may form a ring together with another methine group, or it can form a ring in combination with an auxochrome.

It is preferable that $Ma^1$ to $Ma^7$ are each an unsubstituted methine group, an ethyl-substituted methine group or a methyl-substituted methine group independently.

$na^1$ and $na^2$ each represent 0 or 1 independently, and it is preferable that they are each 0. $ka^1$ represents an integer of 0 to 3, preferably an integer of 0 to 2, far preferably 1 or 2. When $ka^1$ is 2 or 3, $Ma^3$s and $Ma^4$s may be the same or different. Q represents an ion neutralizing electric charge, and y is a number required for neutralization of electric charge.

Incidentally, the dye residue formed by removing a hydrogen atom from any of $Za^1$, $Za^2$, $Ra^1$, $Ra^2$ and $Ma^1$ to $Ma^7$ in formula (3) can be chosen as a dye residue in formula (1) and enter into combination with the linkage group $L^{11}$ or $L^{2k}$ in formula (1).

When the chromophores forming dye residues represented by $Dye^{11}$, $Dye^{12}$ and $Dye^{2k}$ are merocyanine dyes, the merocyanine dyes are preferably those represented by the following formula (4):

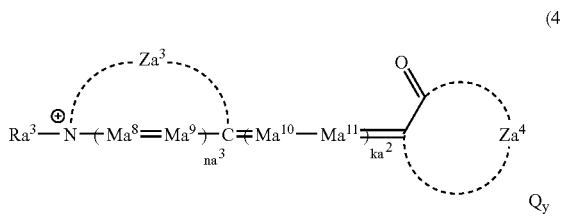

(4)

In the above formula, $Za^3$ represents atoms forming a 5- or 6-membered nitrogen-containing heterocyclic ring which may further be fused together with a benzene ring, a benzofuran ring, a pyridine ring, a pyrrole ring, an indole ring or a thiophene ring. $Za^4$ represents atoms forming an acidic nucleus. $Ra^3$ represents any of a hydrogen atom, a substituted or unsubstituted alkyl group, a substituted or unsubstituted alkenyl group, a substituted or unsubstituted aryl group and a substituted or unsubstituted heterocyclic group (suitable examples of these groups include the same groups as recited for $Ra^1$ and $Ra^2$). $Ma^8$ to $Ma^{11}$ each represent a methine group independently (suitable examples of this group include the same groups as recited for $Ma^1$ to $Ma^7$). $na^3$ is 0 or 1. $ka^2$ represents an integer of 0 to 3, preferably an integer of 0 to 2. Q represents an ion neutralizing electric charge, and y is a number required for neutralization of electric charge.

When $ka^2$ is 2 or 3, $Ma^{10}$s and $Ma^{11}$s may be the same or different. Incidentally, the dye residue formed by removing a hydrogen atom from any of $Za^3$, $Za^4$, $Ra^3$ and $Ma^8$ to $Ma^{11}$ in formula (4) can be chosen as a dye residue in formula (1) and enter into combination with the linkage group $L^{11}$ or $L^{2k}$ in formula (1).

When the chromophores forming dye residues represented by $Dye^{11}$, $Dye^{12}$ and $Dye^{2k}$ are oxonol dyes, the oxonol dyes are preferably those represented by the following formula (5):

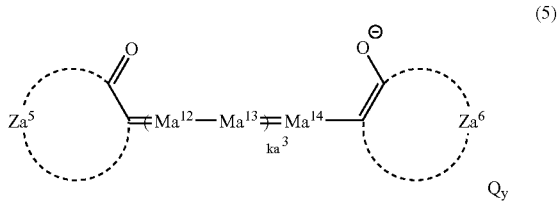

(5)

In the above formula, $Za^5$ and $Za^6$ each represent atoms forming an acidic nucleus independently. $Ma^{12}$ to $Ma^{14}$ each represent a substituted or unsubstituted methine group independently (suitable examples of this group include the same groups as recited for $Ma^1$ to $Ma^7$). $ka^3$ represents an integer of 0 to 3, preferably an integer of 0 to 2, far preferably 1 or 2. When $ka^3$ is 2 or 3, $Ma^{12}$s and $Ma^{13}$s may be the same or different.

Q represents an ion neutralizing electric charge, and y is a number required for neutralization of electric charge.

Incidentally, the dye residue formed by removing a hydrogen atom from any of $Za^5$, $Za^6$ and $Ma^{12}$ to $Ma^{14}$ in formula (5) can be chosen as a dye residue in formula (1) and enter into combination with the linkage group $L^{11}$ or $L^{2k}$ in formula (1).

Examples of groups which $Za^1$, $Za^2$ and $Za^3$ constitute respectively include groups derived from 3–25C oxazole nuclei (e.g., 2-3-methyloxazolyl, 2-3-ethyloxazolyl, 2-3,4-diethyloxazolyl, 2-3-methylbenzoxazolyl, 2-3-ethylbenzoxazolyl, 2-3-sulfoethylbenzoxazolyl, 2-3-sulfopropylbenzoxazolyl, 2-3-methylthioethylbenzoxazolyl, 2-3-methoxyethylbenzoxazolyl, 2-3-sulfobutylbenzoxazolyl, 2-3-methyl-β-naphthoxazolyl, 2-3-methyl-α-naphthoxazolyl, 2-3-sulfopropyl-β-naphthoxazolyl, 2-3-sulfopropyl-α-naphthoxazolyl, 2-3-(3-naphthoxyethyl)benzoxazolyl, 2-3,5-dimethylbenzoxazolyl, 2-6-chloro-3-methylbenzoxazolyl, 2-5-bromo-3-methylbenzoxazolyl, 2-3-ethyl-5-methoxybenzoxazolyl, 2-5-phenyl-3-sulfopropylbenzoxazolyl, 2-5-(4-bromophenyl)-3-sulfobutylbenzoxazolyl, 2-3-methyl-5,6-dimethylthiobenzoxazolyl), groups derived from 3–25C thiazole nuclei (e.g., 2–3-methylthiazolyl, 2-3-ethylthiazolyl, 2-3-sulfopropylthiazolyl, 2-3-sulfobutylthiazolyl, 2-3,4-dimethylthiazolyl, 2-3,4,5-trimethylthiazolyl, 2-3-carboxyethylthiazolyl, 2-3-methylbenzothiazolyl, 2-3-ethylbenzothiazolyl, 2-3-butylbenzothiazolyl, 2-3-sulfopropylbenzothiazolyl, 2-3-sulfobutylbenzothiazolyl, 2-3-methyl-β-naphthothiazolyl, 2-3-sulfopropyl-γ-naphthothiazolyl, 2-3-(1-naphthoxyethyl)benzothiazolyl, 2-3,5-dimethylbenzothiazolyl, 2-6-chloro-3-methylbenzothiazolyl, 2-6-iodo-3-ethylbenzothiazolyl, 2-5-bromo-3-methylbenzothiazolyl, 2-3-ethyl-5-methoxybenzothiazolyl, 2-5-phenyl-3-sulfopropylbenzothiazolyl, 2-5-(4-bromophenyl)-3-sulfobutylbenzothiazolyl, 2-3-methyl-5,6-dimethylthiobenzothiazolyl), groups derived from 3–25C imidazole nuclei (e.g., 2-1,3-diethylimidazolyl, 2-1,3-dimethylimidazolyl, 2-1-methylbenzimidazolyl, 2-1,3,4-triethylimidazolyl, 2-1,3-diethylbenzimidazolyl, 2-1,3,5-trimethylimidazolyl, 2-6-chloro-1,3-dimethylbenzimidazolyl, 2-5,6-dichloro-1,3-diethylbenzimidazolyl, 2-1,3-disulfopropyl-5-cyano-6-chlorobenzimidazolyl), groups derived from 10–30C indolenine nuclei (e.g., those derived from 3,3-dimethylindolenine), groups derived from 9–25C quinoline nuclei (e.g., 2-1-methylquinolyl, 2-1-ethylquinolyl, 2-1-methyl-6-chloroquinolyl, 2-1,3-diethylquinolyl, 2-1-methyl-6-methylthioquinolyl, 2-1-sulfopropylquinolyl, 4-1-methylquinolyl, 4-1-sulfoethylquinolyl, 4-1-methyl-7-chloroquinolyl, 4-1,8-diethylquinolyl, 4-1-methyl-6-methylthioquinolyl, 4-1-sulfopropylquinolyl), groups derived from 3–25C selenazole nuclei (e.g., 2-3-methylbenzoselenazolyl) and groups derived from pyridine nuclei (e.g., 2-pyridyl). Other examples of heterocyclic nuclei formed by $Za^1$, $Za^2$ and $Za^3$ respectively include tiazoline nuclei, oxazoline nuclei, selenazoline nuclei, tetrazoline nuclei, tellurazole nuclei, benzotellurazole nuclei, imidazoline nuclei, imidazo[4,5-quinoxaline]nuclei, oxadiazole nuclei, thiadiazole nuclei, tetrazole nuclei and pyrimidine nuclei. These nuclei may have substituents. Suitable examples of such substituents include alkyl groups (e.g., methyl, ethyl, propyl), halogen atoms (e.g., chlorine, bromine, iodine, fluorine, a nitro group, alkoxy groups (e.g., methoxy, ethoxy), aryl groups (e.g., phenyl), heterocyclic groups (e.g., 2-pyridyl, 3-pyridyl, 1-pyrrolyl, 2-thienyl), aryloxy groups (e.g., pehnoxy), acylamino groups (e.g., acetylamino, benzoylamino), carbamoyl groups (e.g., N,N-dimethylcarbamoyl), a sulfo group, sulfonamido groups (e.g., methanesulfonamido), sulfamoyl groups (e.g., N-methylsulfamoyl), a hydroxyl group, a carboxyl group, alkylthio groups (e.g., methylthio) and a cyano group. Of the nuclei recited above, the oxazole nuclei, the imidazole nuclei and the thiazole nuclei are preferred over the others. These nuclei may further be fused together with other rings. Examples of rings to be fused include benzene rings, benzofuran rings, pyridine rings, pyrrole rings, indole rings and thiophene rings.

$Za^4$, $Za^5$ and $Za^6$ each represent atoms required for forming an acidic nucleus as defined in *The Theory of the Photographic Process,* 4th edition edited by James, page 198, Macmillan Publishing Co., Inc. (1997). Examples of such an acidic nucleus include pyrazol-5-one, pyrazolidine-3,5-dione, imidazoline-5-one, hydantoin, 2- or 4-thiohydantoin, 2-iminooxazolidine-4-one, 2-oxazoline-5-one, 2-thiooxazoline-2,4-dione, isorhodanine, rhodanine, thiophene-3-one, thiophene-3-one-1,1-dioxide, indoline-2-one, indoline-3-one, 2-oxoindazolium, 5,7-dioxo-6,7-dihydrothiazolo[3,2-a]pyrimidine, 3,4-dihydroisoquinoline-4-one, 1,3-dioxane-4,6-dione (e.g., meldrum's acid), barbituric acid, 2-thiobarbituric acid, coumarin-2,4-dione, indazoline-2-one, pyrido[1,2-a]pyrimidine-1,3-dione, pyrazolo[1,5-b]quinazolone, pyrazolopyridone, 3-dicyanomethylidenyl-3-phenylpropionitrile and 5- or 6-membered carbon ring (e.g., hexane-1,3-dione, pentane-1,3-dione, indane-1,3-dione). Of these nuclei, pyrazole-5-one, barbituric acid, 2-thiobarbituric acid and 1,3-dioxane-4,6-dione are preferred over the others.

Examples of cyanine dyes, merocyanine dyes and oxonol dyes include those described in F. M. Harmer, *Heterocyclic Compounds—Cyanine Dyes and Related Compounds,* Jhon & Wiley & Sons, New York, London (1964).

In formula (1), $L^{11}$ and $L^{2k}$ each represent a divalent linkage group independently, and have no particular restriction except that each of the linkage groups forms no π-conjugated system between the chromophores linked thereto, with suitable examples including 0–100C, preferably 1–20C, linkage groups made up of one or more groups selected from among alkylene groups (those containing 1 to 20 carbon atoms, such as methylene, ethylene, propylene, butylene and pentylene), arylene groups (those containing 6 to 26 carbon atoms, such as phenylene and naphthylene), alkynylene groups (those containing 2 to 20 carbon atoms, such as ethynylene and propnylene), —CO—N($R^{101}$)—, —CO—O—, —$SO_2$—N($R^{102}$)—, —$SO_2$—O—, —N($R^{103}$)—CO—N($R^{104}$)—, $SO_2$—, —SO—, —S—, —O—, —CO—, —N($R^{105}$)— and heterylene groups (those containing 1 to 26 carbon atoms, such as 6-chloro-1,3,5-triazyl-2,4-diyl and pyrimidine-2,4-diyl). Herein, $R^{101}$, $R^{102}$, $R^{103}$, $R^{104}$ and $R^{105}$ each independently represent any of a hydrogen atom, a substituted or unsubstituted alkyl group and a substituted or unsubstituted aryl group. In addition, when $L^{11}$ and $L^{2k}$ are each a combination of two or more of the linkage groups as recited above, at least two (preferably two) of the linkage groups may combine with each other to form a ring.

As $L^{11}$ and $L^{2k}$ each, the linkage group formed by bonding two alkylene groups (preferably including ethylene) together to form a ring, especially a 5- or 6-membered ring (preferably a cyclohexane ring), is preferred.

In formula (1), n is an integer of 0 to 10, preferably 0 to 5, far preferably 0 to 3, particularly preferably 0 to 2.

In formula (1), k represents all integers in the 0 to n range. For instance, when n is 2, k represents three integers of 0, 1 and 2, $Dye^{2k}$ represents three independent chromophores $Dye^{20}$, $Dye^{21}$ and $Dye^{22}$, and $L^{2k}$ represents three independent linkage groups $L^{20}$, $L^{21}$ and $L^{22}$. When n is an integer greater than one, two or more chromophores represented by $Dye^{2k}$ may be the same or different, and two or more linkage groups represented by $L^{2k}$ may be the same or different.

In formula (1), Q represents an ion neutralizing electric charge, and y is a number required for neutralization of electric charge. Whether a certain compound is a cation or an anion, or whether it has net ionic charge or not, depends on what kind of substituent the compound has. In formulae (1), (3), (4) and (5) each, the ion represented by Q has three cases depending on the electric charge of its counter dye molecule: a case where it is a cation, a case where it is an anion, and a case where Q is absent when the dye molecule has no electric charge. The ion represented by Q has no particular restrictions, but it may be an ion derived from an inorganic compound or an ion derived from an organic compound. In addition, the electric charge of an ion represented by Q may be univalent or polyvalent. Examples of a cation represented by Q include metal ions such as sodium ion and potassium ion, and onium ions such as quaternary ammonium ions, oxoniumions, sulfoniumions, phosphoniumions, selenonium ions and iodonium ions. Examples of an anion represented by Q include halide anions such as chloride ion, bromide ion and fluoride ion, heteropolyacid ions such as sulfate ion, phosphate ion and hydrogen phosphate ion, organic polyvalent anions such as succinate ion, maleate ion, fumarate ion and aromatic disulfonate ions, tetrafluoroborate ion and hexafluorophosphate ion.

The ions suitable as cation represented by Q are onium ions, especially quaternary ammonium ions. Of the quaternary ammonium ions, the 4,4'-bipyridinium cations represented by formula (I-4) in JP-A-2000-52658 and the 4,4'-bipyridinium cations disclosed in JP-A-2000-59652 are preferred in particular.

The ions suitable as anion represented by Q are tetrafluoroborate ion, hexafluorophosphate ion and organic polyvalent anions, especially 2- or 3-valent organic anions derived from naphthalenedisulfonic acid derivatives. Of the 2- or 3-valent organic anions, the naphthalenedisulfonic acid anions disclosed in JP-A-10-226170 are preferred in particular.

Of the dyes represented by formula (1), dyes having structures represented by the following formula (6) are preferred over the others as the dye used in the present optical information-recording medium:

i-butyl, t-butyl, i-amyl, cyclopropyl, cyclohexyl, benzyl, phenetyl). When $R^{11}$, $R^{12}$, $R^{13}$ and $R^{14}$ are each an alkyl group, carbon rings (e.g., cyclopropane, cyclobutane, cyclopentane, cyclohexane, 2-methylcyclohexane, cycloheptane, cyclooctane) or heterocyclic rings (e.g., pyridine, chroman, morpholine) may be formed by combining $R^{11}$ with $R^{12}$ and, at the same time, combining $R^{13}$ with $R^{14}$. The alkyl group suitable as $R^{11}$, $R^{12}$, $R^{13}$ and $R^{14}$ each is a 1–8C open-chain or cyclic alkyl group, especially a 1–5C open-chain (straight or branched) alkyl group, an alkyl group capable of forming a 1–8C ring (preferably a cyclohexane ring) as a combination of $R^{11}$ and $R^{12}$ or as a combination of $R^{13}$ and $R^{14}$, or a 1–20C substituted alkyl group (e.g., benzyl, phenetyl).

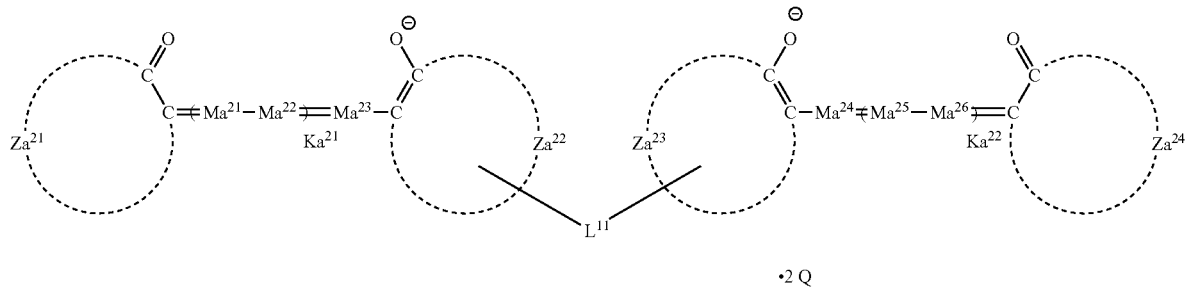

(6)

·2 Q wherein $Za^{21}$, $Za^{22}$, $Za^{23}$ and $Za^{24}$ each represent atoms forming an acidic nucleus independently, and as concrete examples of $Za^{21}$, $Za^{22}$, $Za^{23}$ and $Za^{24}$, the acidic nuclei described for $Za^5$ and $Za^6$ in formula (5) described above are exemplified. Also, the preferred examples thereof are the same as in the above described $Za^5$ and $Za^6$.

$Ma^{21}$, $Ma^{22}$, $Ma^{23}$, $Ma^{24}$, $Ma^{25}$ and $Ma^{26}$ each represent a substituted or unsubstituted methine group independently, and as concrete examples of $Ma^{21}$, $Ma^{22}$, $Ma^{23}$, $Ma^{24}$, $Ma^{25}$ and $Ma^{26}$ have the same meaning as described for $Ma^1$ to $Ma^7$ in formula (3) described above.

$L^{11}$ is a divalent linkage group forming no π-conjugated system together with its two bonds, and as concrete examples of $L^{11}$, ones described for $L^{11}$ and $L^{2k}$ in formula (1) described above are exemplified.

$Ka^{21}$ and $Ka^{22}$ each represent an integer of 0 to 3, preferably 0 to 2 and more preferably 1 or 2, independently; and $Ma^{21}$s, $Ma^{22}$s, $Ma^{25}$s and $Ma^{26}$s present in a case where $Ka^{21}$ and $Ka^{22}$ are each 2 or 3 may be the same or different.

Q represents a univalent cation for neutralizing electric charge, or 2Q represents a divalent cation, and as concrete examples and preferred examples of Q, ones described in a case where Q in formula (1) is a cation are exemplified, respectively.

It is most advantageous for the present optical information-recording medium to contain a dye having a structure represented by formula (2) as the dye represented by formula (1).

In formula (2), $R^{11}$, $R^{12}$, $R^{13}$ and $R^{14}$ each independently represent any of a hydrogen atom, a substituted or unsubstituted alkyl group, a substituted or unsubstituted aryl group and a substituted or unsubstituted heterocyclic group. Examples of substituted or unsubstituted alkyl groups represented by $R^{11}$, $R^{12}$, $R^{13}$ and $R^{14}$ respectively include 1–20C alkyl groups (e.g., methyl, ethyl, propyl, butyl, Examples of a substituted or unsubstituted aryl group represented by $R^{11}$, $R^{12}$, $R^{13}$ and $R^{14}$ each in formula (2) include 6–20C aryl groups (e.g., phenyl, naphthyl). The aryl group suitable as $R^{11}$, $R^{12}$, $R^{13}$ and $R^{14}$ each is a 6–10C aryl group.

The substituted or unsubstituted heterocyclic group represented by $R^{11}$, $R^{12}$, $R^{13}$ and $R^{14}$ each in formula (2) is a 5- or 6-membered saturated or unsaturated heterocyclic group made up of carbon atoms and nitrogen, oxygen or/and sulfur atom(s), with examples including a pyridyl group, a pyrimidyl group, a pyridazyl group, a piperidyl group, a triazyl group, a pyrrolyl group, an imidazolyl group, a triazolyl group, a furanyl group, a thiophenyl group, a thiazolyl group, an oxazolyl group, an isothiazolyl group and an isoxazolyl group. Further, the heterocyclic group may be a group formed by fusing each of the above-recited groups together with a benzene ring (such as a quinolyl group, a benzimidazolyl group, a benzothiazolyl group or a benzoxazolyl group). The substituted or unsubstituted heterocyclic group suitable as $R^{11}$, $R^{12}$, $R^{13}$ and $R^{14}$ each is a 6–10C substituted or unsubstituted heterocyclic group.

Examples of a substituent present in the substituted or unsubstituted alkyl group, the substituted or unsubstituted aryl group and the substituted or unsubstituted heterocyclic group represented by each of $R^{11}$, $R^{12}$, $R^{13}$ and $R^{14}$ in formula (2) include a group S of substituents as recited below.

In the group S are included 1–20C alkyl groups (e.g., methyl, ethyl, propyl, carboxymethyl, ethoxycarbonylmethyl), 7–20C aralkyl groups (e.g., benzyl, phenetyl), 1–8C alkoxy groups (e.g., methoxy, ethoxy), 6–20C aryl groups (e.g., phenyl, naphthyl), 6–20C aryloxy groups (e.g., phenoxy, naphthoxy), heterocyclic groups (e.g., pyridyl, pyrimidyl, pyridazyl, benzimidazolyl, benzothiazolyl, benzoxazolyl, 2-pyrrolidinone-1-yl, 2-piperidone-1-yl, 2,4- dioxyimidazolidine-3-yl, 2,4-dioxyoxazolidine-3-yl, succinimido, phthalimido, maleimido), halogen atoms (e.g., fluorine, chlorine, bromine, iodine), a carboxyl group, 2–10C alkoxycarbonyl groups (e.g., methoxycarbonyl, ethoxycarbonyl), a cyano group, 2–10C acyl groups (e.g., acetyl, pivaloyl), 1–10C carbamoyl groups (e.g., carbamoyl, methylcarbamoyl, morpholinocarbamoyl), an amino group, 1–20C substituted amino group (e.g., dimethylamino, diethylamino, bis(methylsulfonylethyl)amino, N-ethyl-N'-sulfoethylamino), a sulfo group, a hydroxyl group, a nitro group, 1–10C sulfonamido groups (e.g., methanesulfonamido), 1–10C ureido groups (e.g., ureido, methylureido), 1–10C sulfonyl groups (e.g., methanesulfonyl, ethanesulfonyl), 1–10C sulfinyl groups (e.g., methanesulfinyl), and 0–10C sulfamoyl groups (e.g., sulfamoyl, methanesulfamoyl), When the substituent is a carboxyl group or a sulfo group, it may be in a salt state.

In formula (2), $R^{21}$, $R^{22}$ and $R^3$ each independently represent any of a hydrogen atom, a substituted or unsubstituted alkyl group, a substituted or unsubstituted alkoxy group, a substituted or unsubstituted aryl group, a substituted or unsubstituted aryloxy group, a substituted or unsubstituted heterocyclic group, a halogen atom, a carboxyl group, a substituted or unsubstituted alkoxycarbonyl group, a cyano group, a substituted or unsubstituted acyl group, a substituted or unsubstituted carbamoyl group, an amino group, a substituted amino group, a sulfo group, a hydroxyl group, a nitro group, a substituted or unsubstituted alkylsulfonylamino group, a substituted or unsubstituted carbamoylamino group, a substituted or unsubstituted alkylsulfonyl group, a substituted or unsubstituted arylsulfonyl group, a substituted or unsubstituted sulfinyl group, and a substituted or unsubstituted sulfamoyl group. It is appropriate that $R^{21}$, $R^{22}$ and $R^3$ be each a hydrogen atom, a substituted or unsubstituted 1–20C alkyl group, a substituted or unsubstituted 2–20C heterocyclic group, a substituted or substituted 1–20C alkoxy group, a substituted or substituted 6–20C aryl group, or a halogen atom. Further, any of a hydrogen atom, a substituted or unsubstituted 1–10C alkyl group, a sub-situted or unsubstituted 1–10C alkoxy group, a substituted or unsubstituted 2–10C heterocyclic group and a halogen atom, especially any of a hydrogen atom, a substituted or unsubstituted 1–5C alkyl group, a substituted or unsubstituted 1–5C alkoxy group, a substituted or unsubstituted 2–6C heterocyclic group and a halogen atom, is preferred as $R^{21}$, $R^{22}$ and $R^3$ each. The groups that $R^{21}$, $R^{22}$ and $R^3$ represent may further have substituents, and examples of such substituents include the group S mentioned above.

It is preferable that m is 0 and both $R^{21}$ and $R^{22}$ are hydrogen atoms, or m is 1 and all of $R^{21}$, $R^{22}$ and $R^3$ are hydrogen atoms.

m in formula (2) represents an integer of 0 or more, preferably an integer of 0 to 5, far preferably an integer of 0 to 3, particularly preferably an integer of 0 to 2.

When m is 2 and above, $R^3$s in formula (2) may be the same or different and each represent a hydrogen atom or the above-mentioned substituent independently.

$Z^{x+}$ in formula (2) represents a cation, and x represents an integer of 1 or greater.

Examples of a cation represented by $Z^{x+}$ include the cations recited as examples of Q in formula (1). The cations suitable as $Z^{x+}$ are quaternary ammonium ions, preferably the 4,4'-bipyridinium cations represented by formula (I-4) in JP-A-2000-52658 and the 4,4'-bipyridinium cations disclosed in JP-A-2000-59652. x in formula (2) is preferably an integer of 1 or 2.

Dyes represented by the present formula (2) are novel compounds synthesized by the present Inventors for the first time.

Examples of compounds represented by the present formula (1) or formulae (2) and (6) are illustrated below, but these examples should not be construed as limiting the scope of the invention.

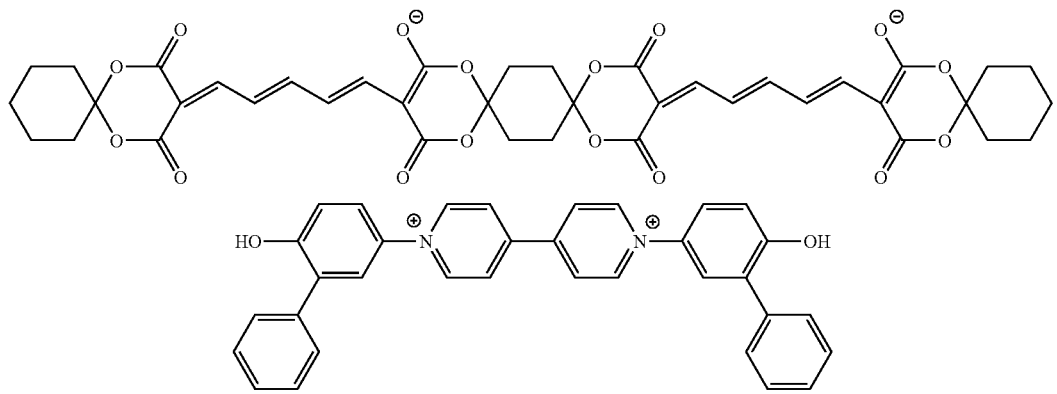

(1)

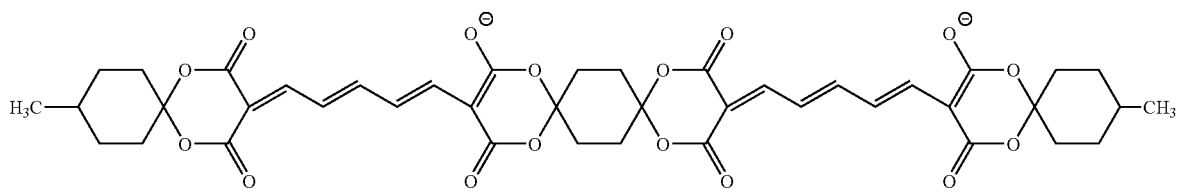

(2)

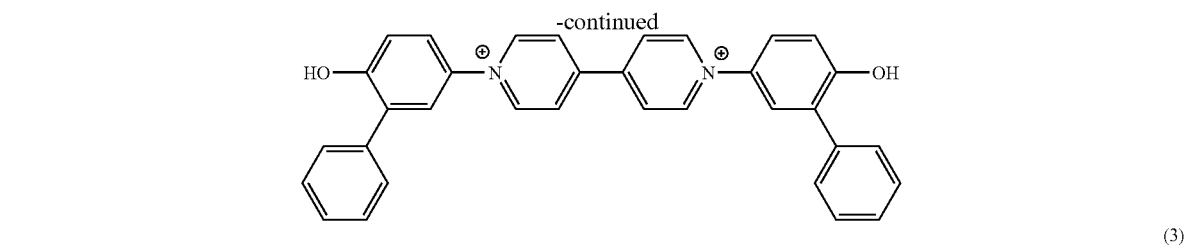
(3)
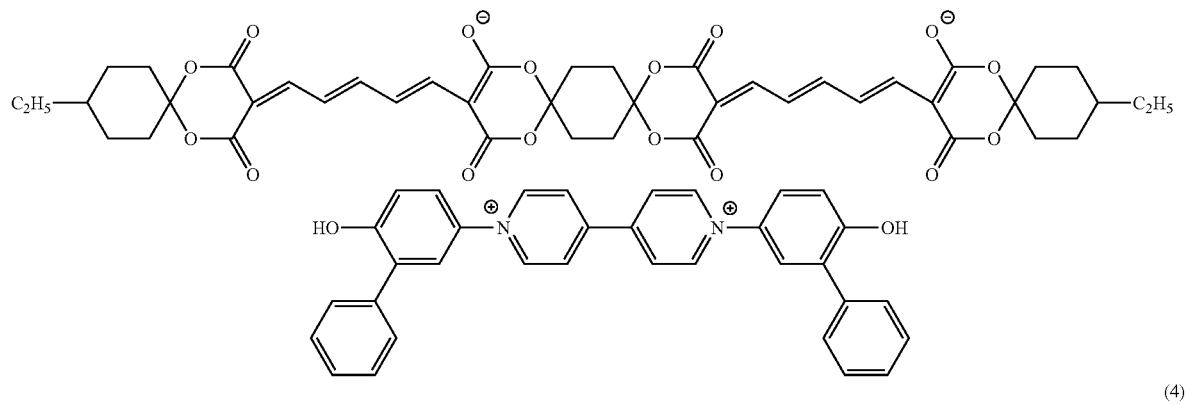
(4)
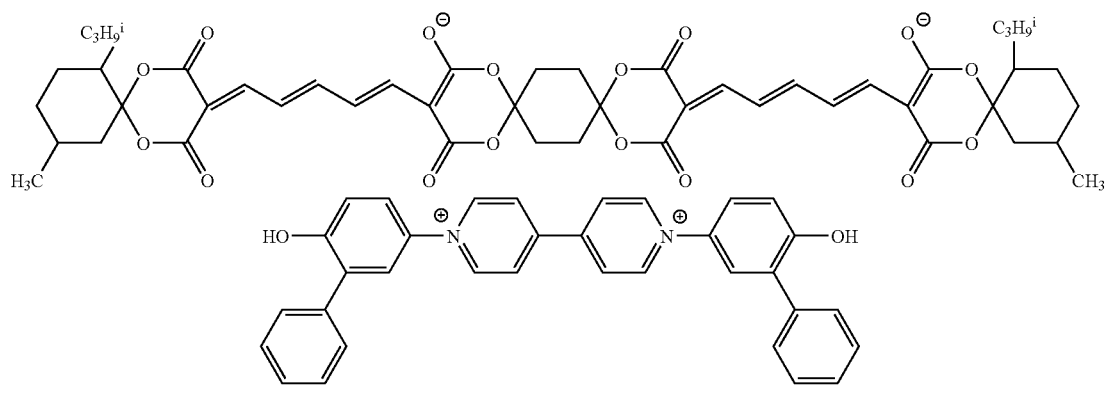
(5)
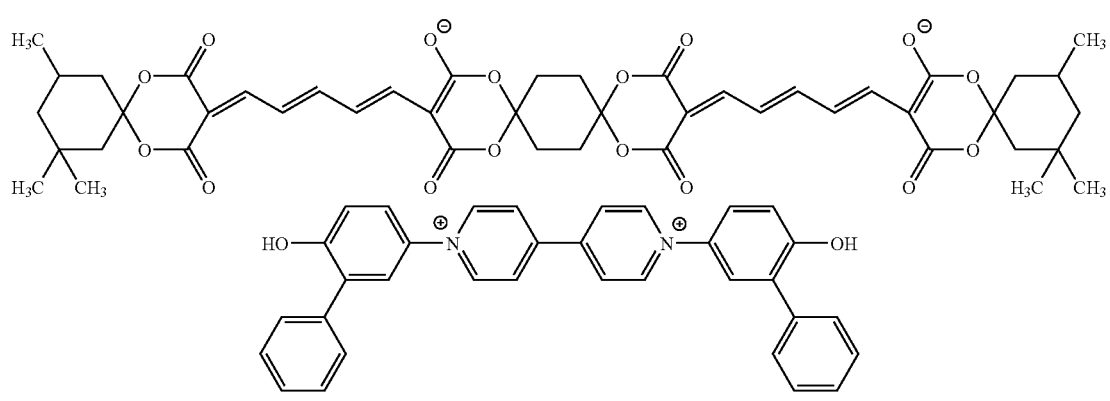
(6)
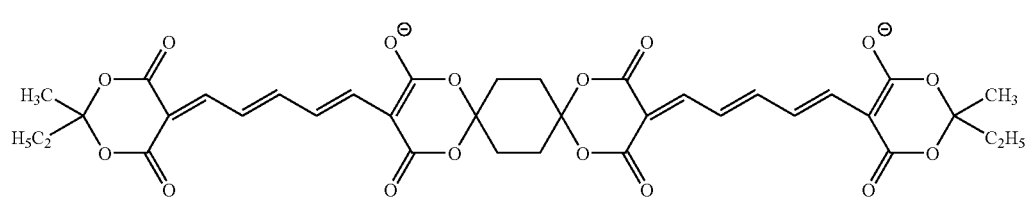

-continued
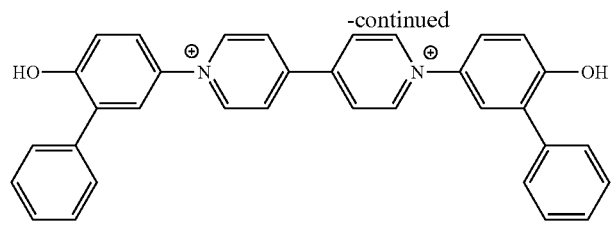
(7)
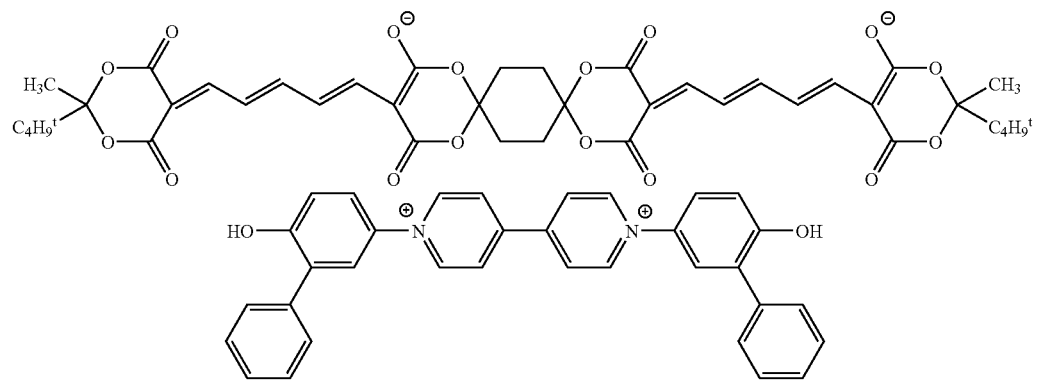
(8)
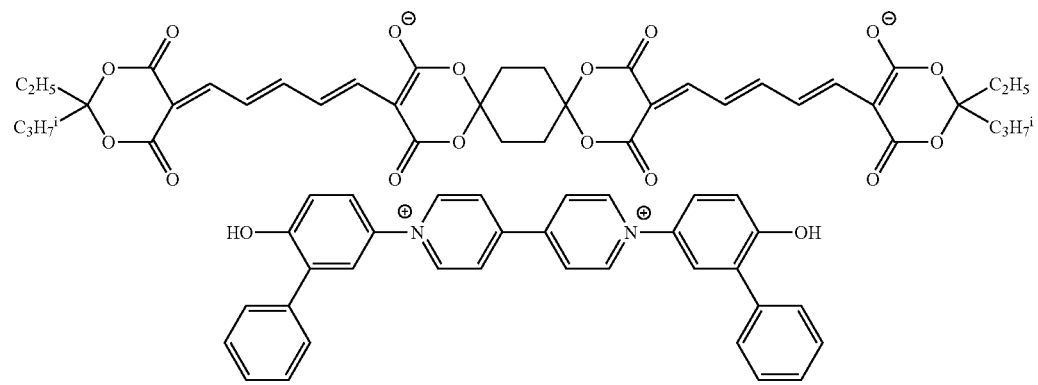
(9)
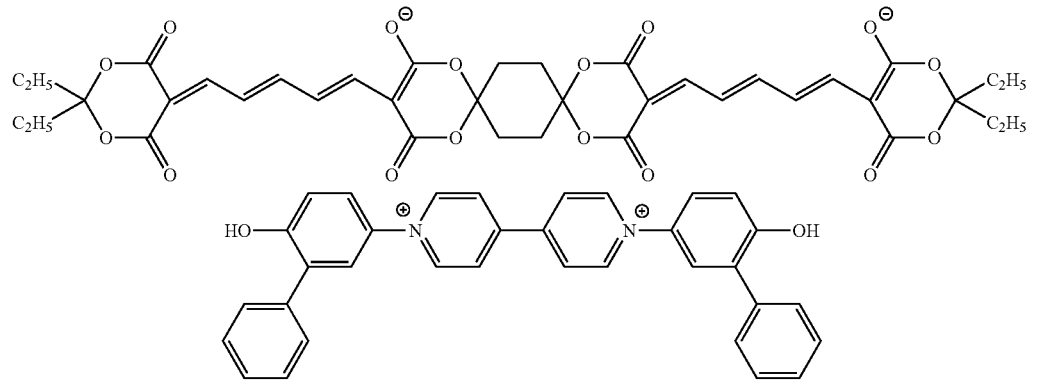
(10)
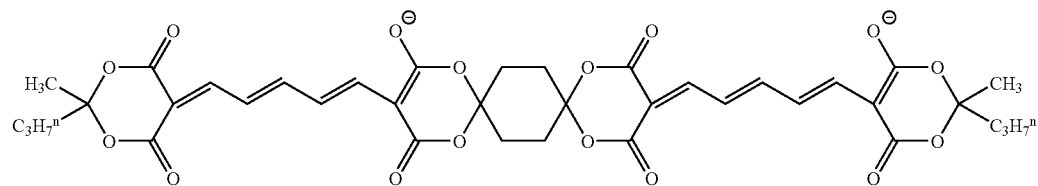

-continued
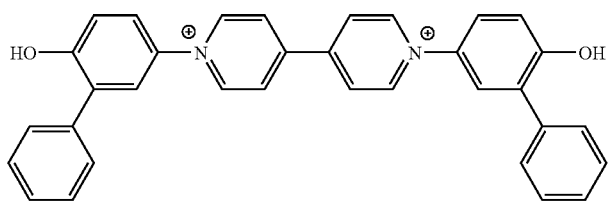
(11)
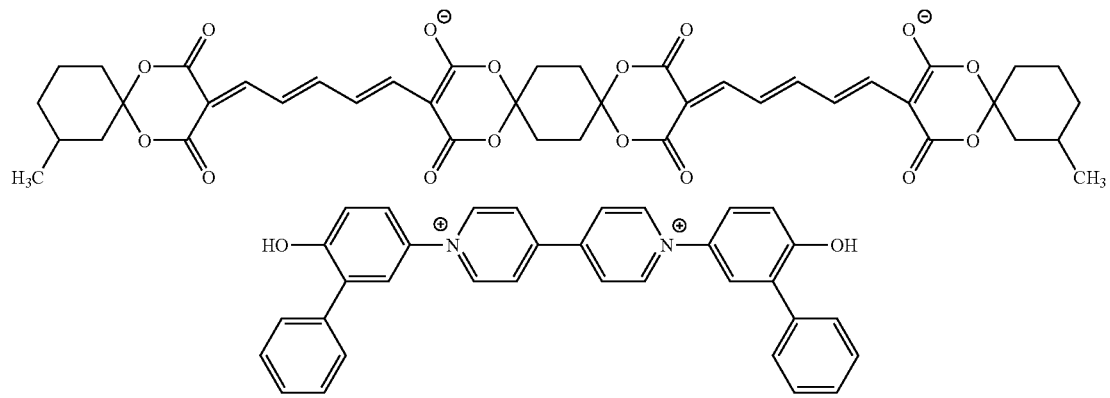
(12)
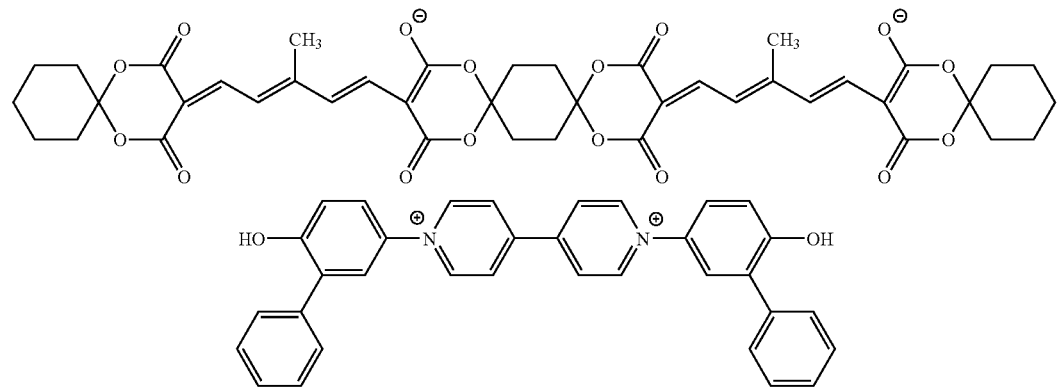
(13)
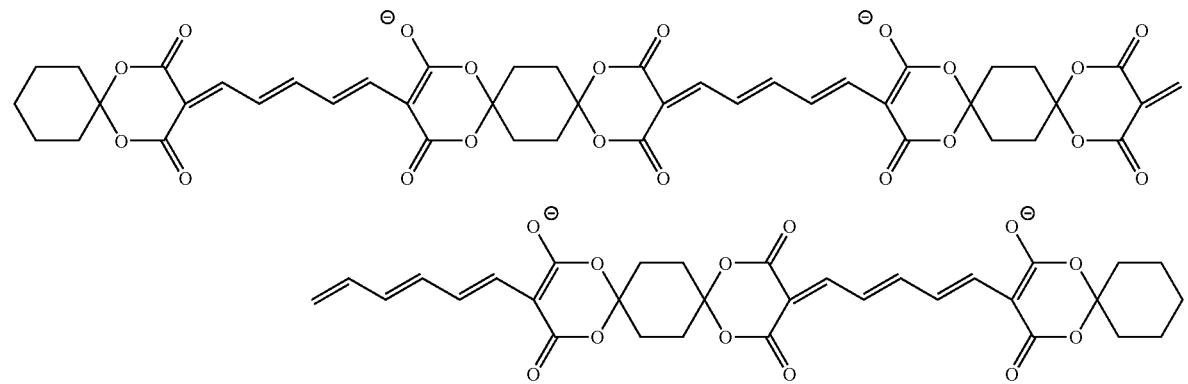

-continued
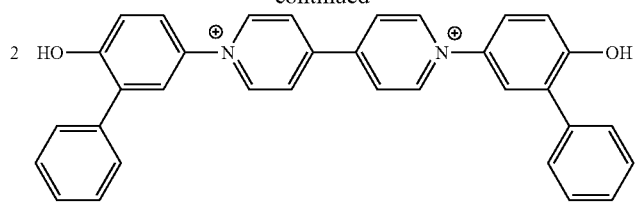
(14)
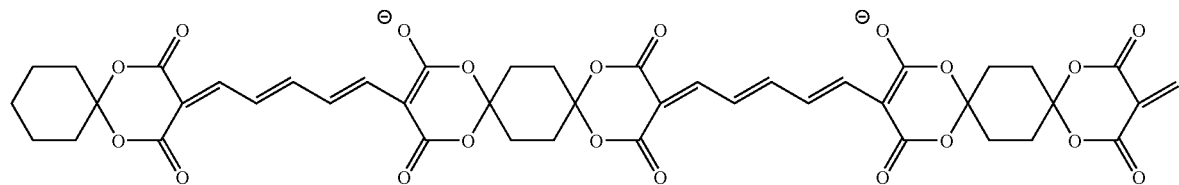
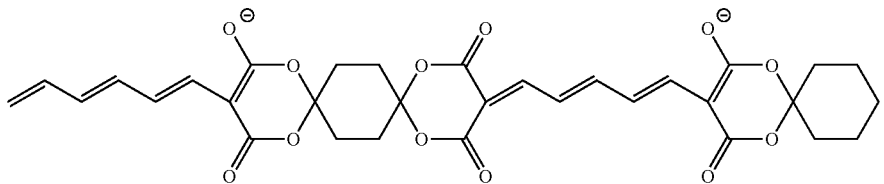
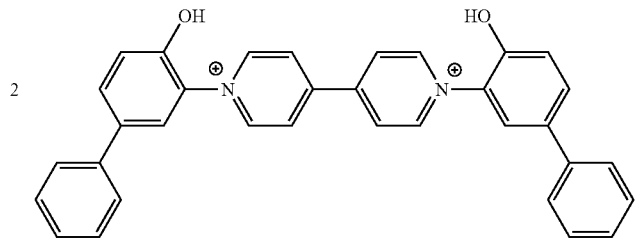
(15)
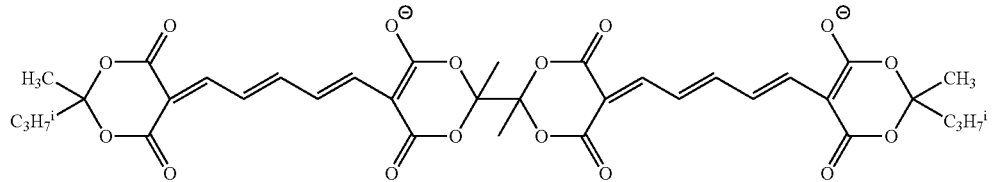
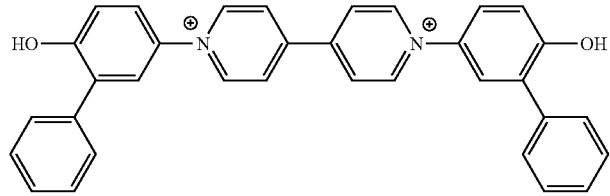
(16)
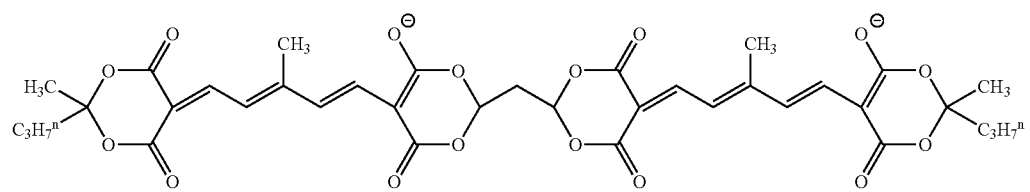
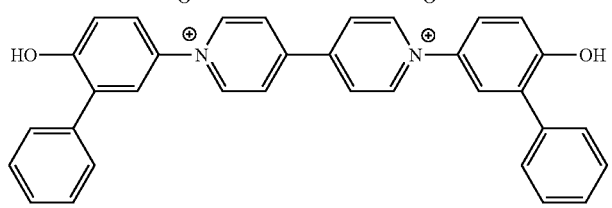

(17)
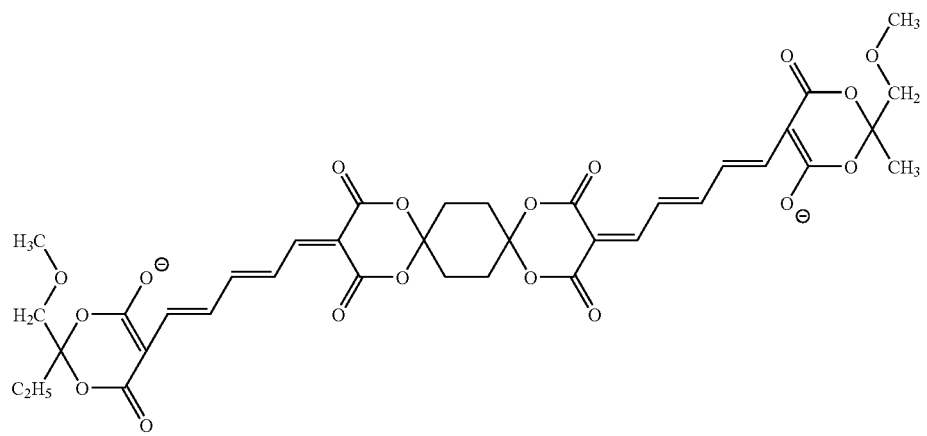
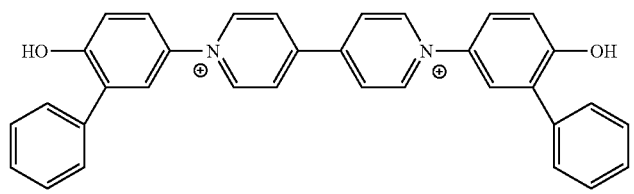
(18)
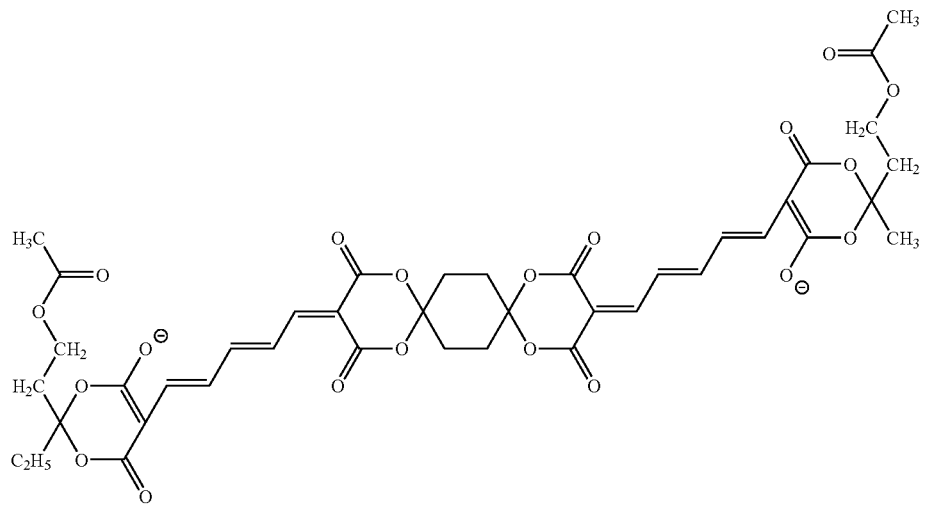
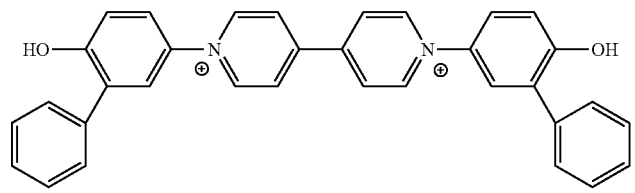

(19)
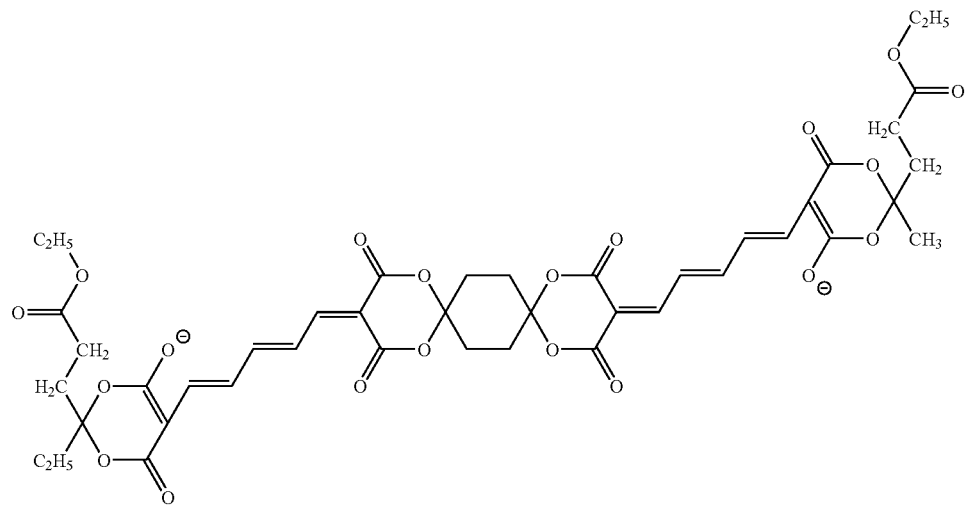
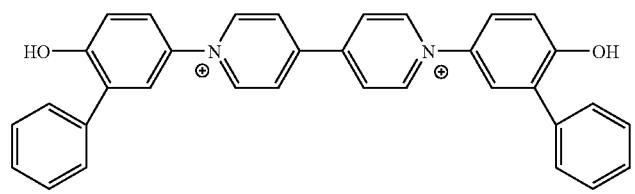
(20)
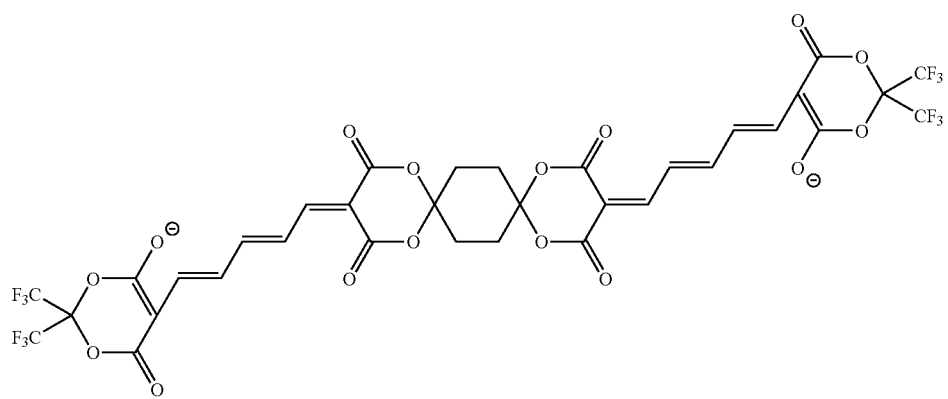
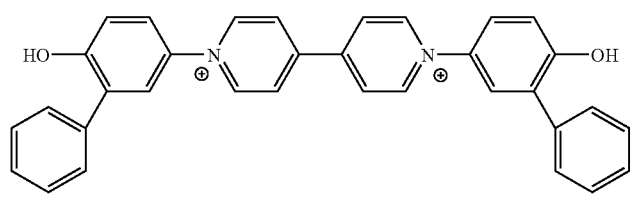

-continued
(21)
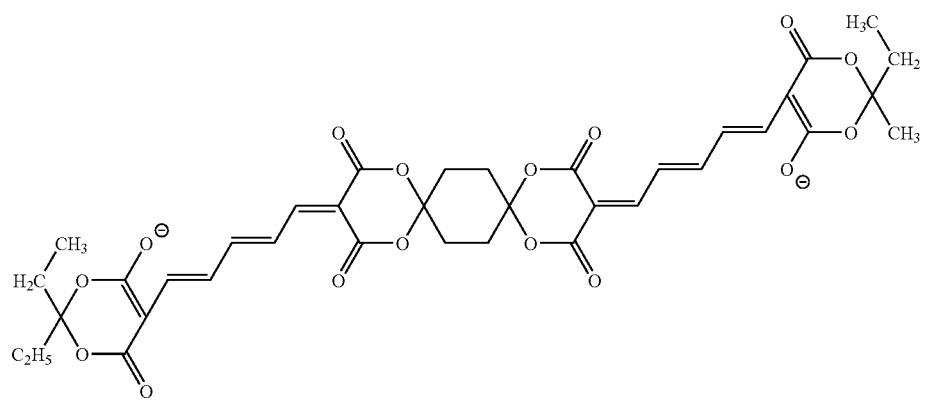
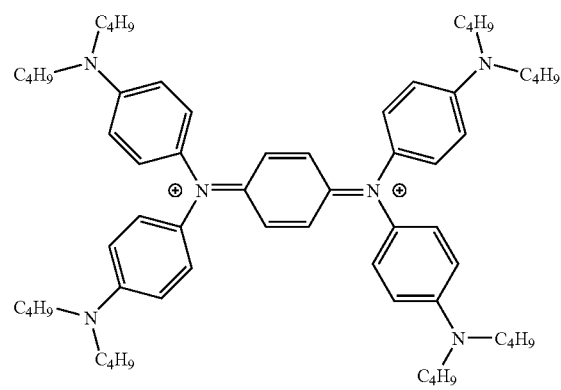
(22)
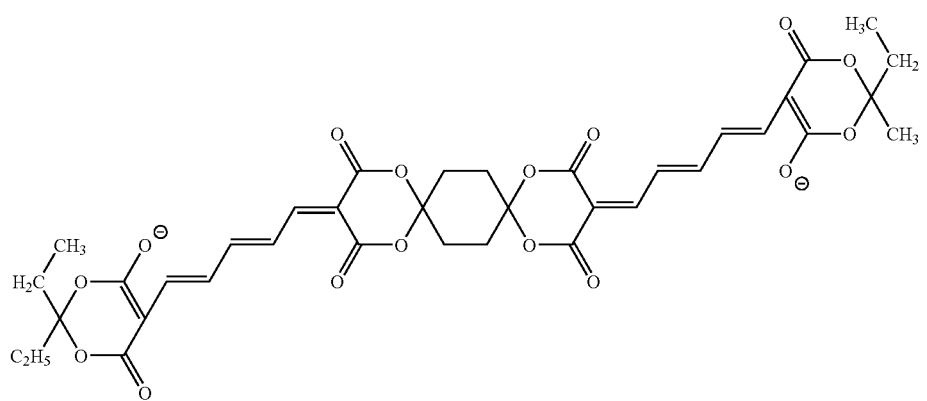
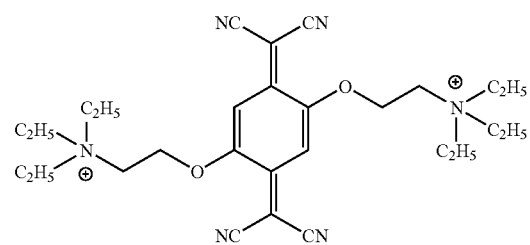

-continued
(23)
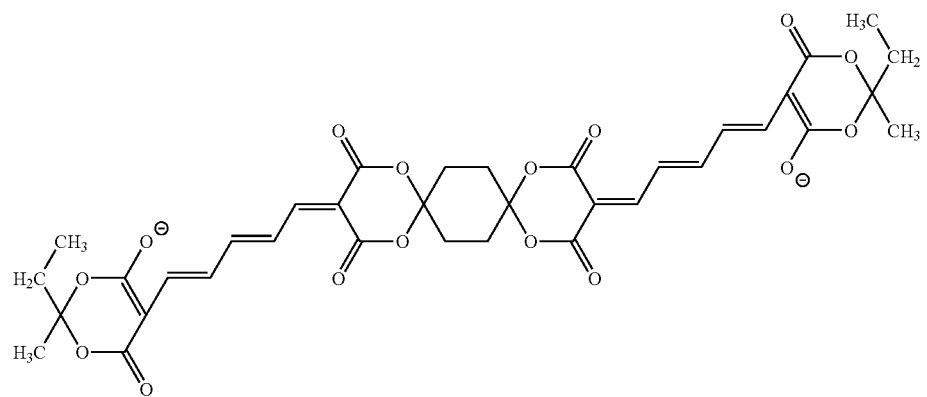
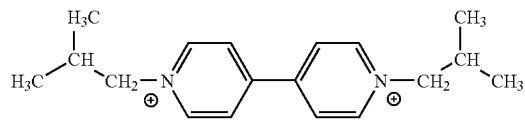
(24)
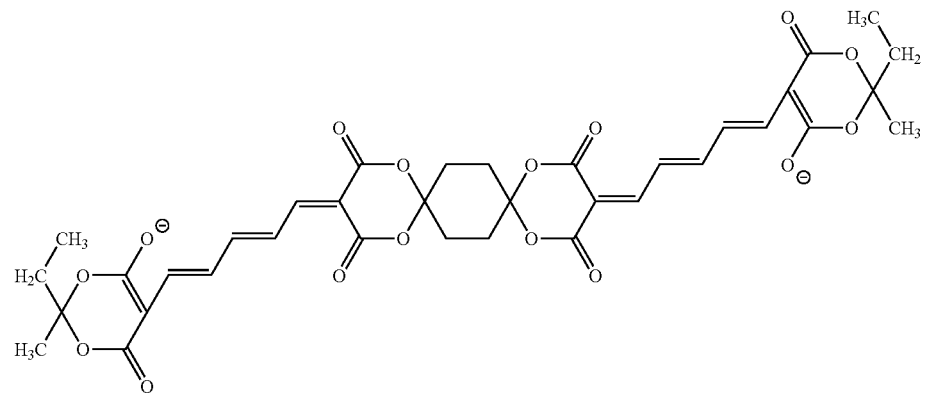
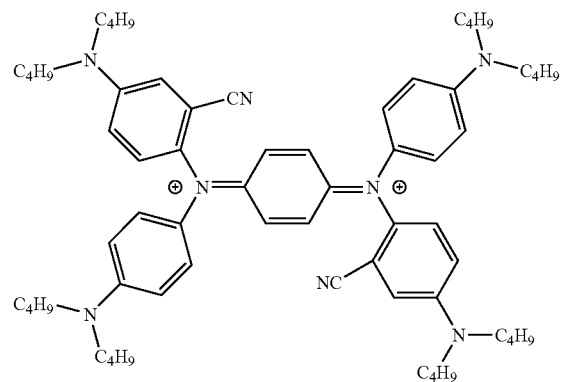

(25)
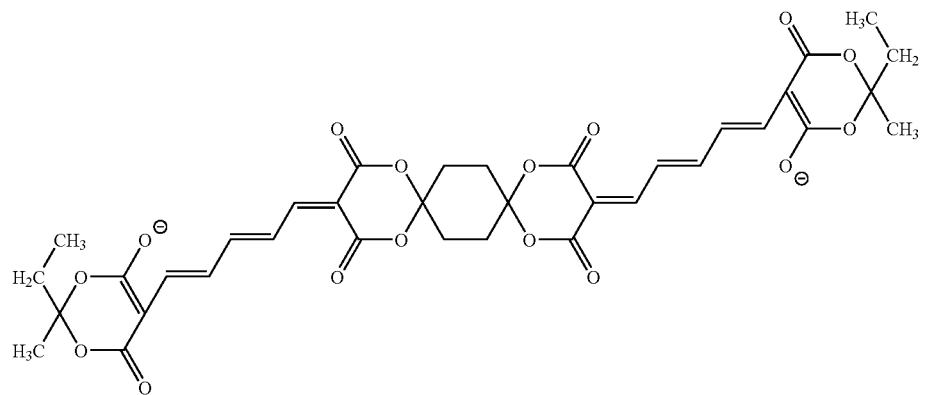
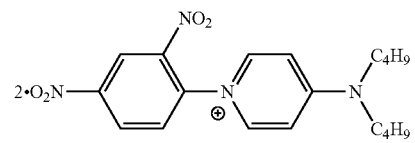
(26)
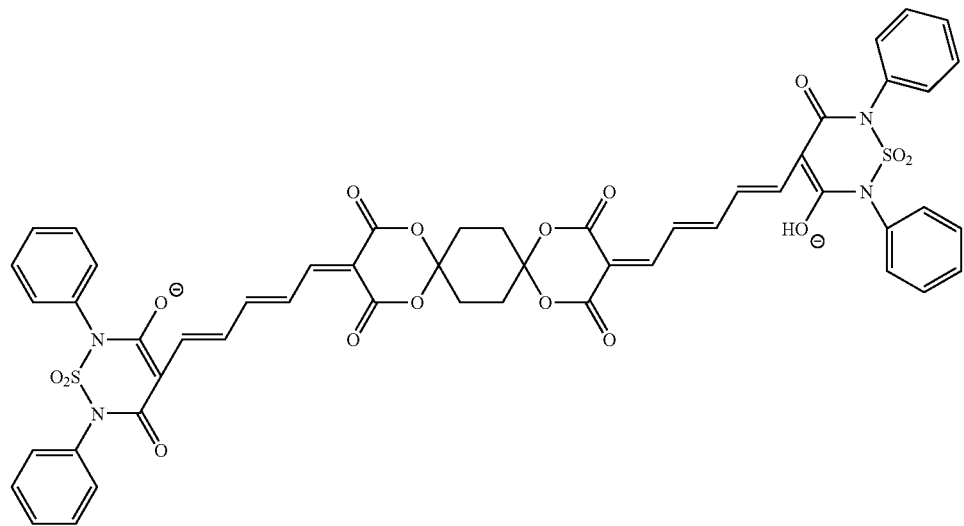
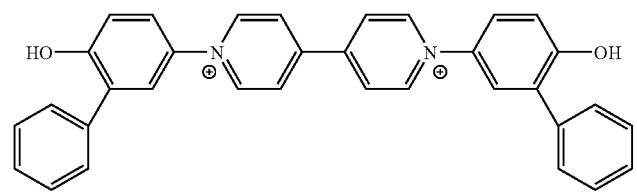

-continued
(27)
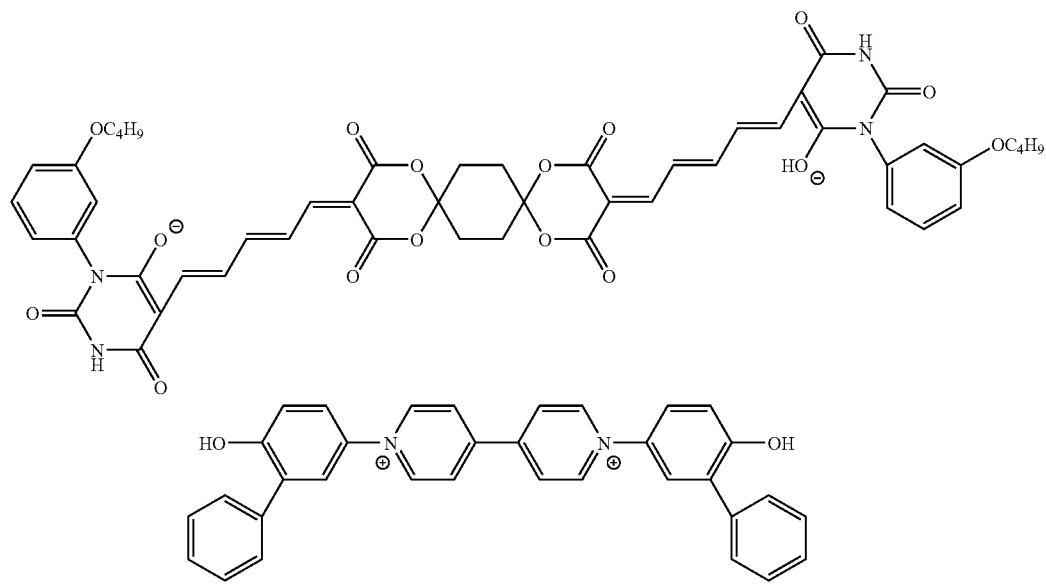
(28)
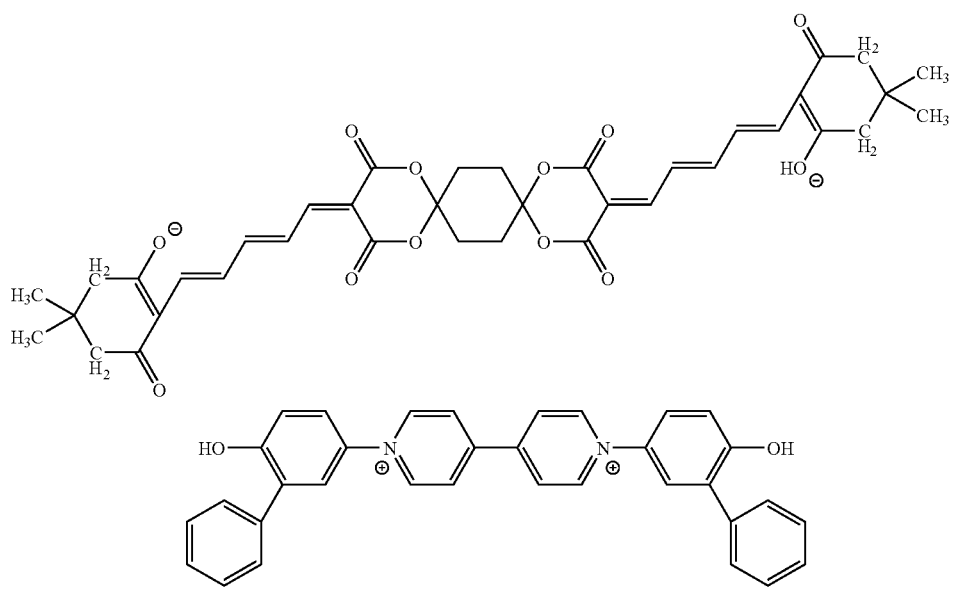
(29)
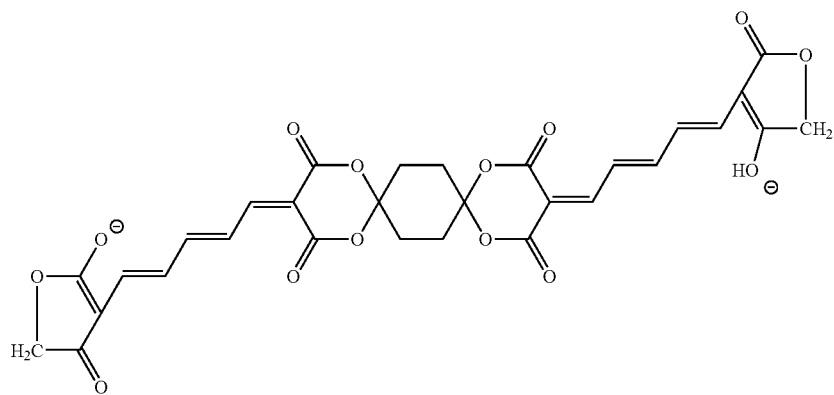

-continued
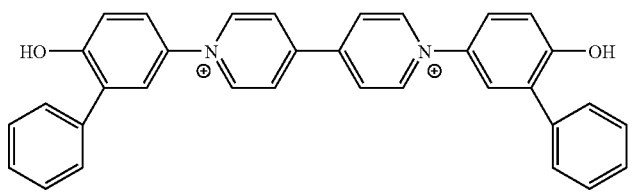
(30)
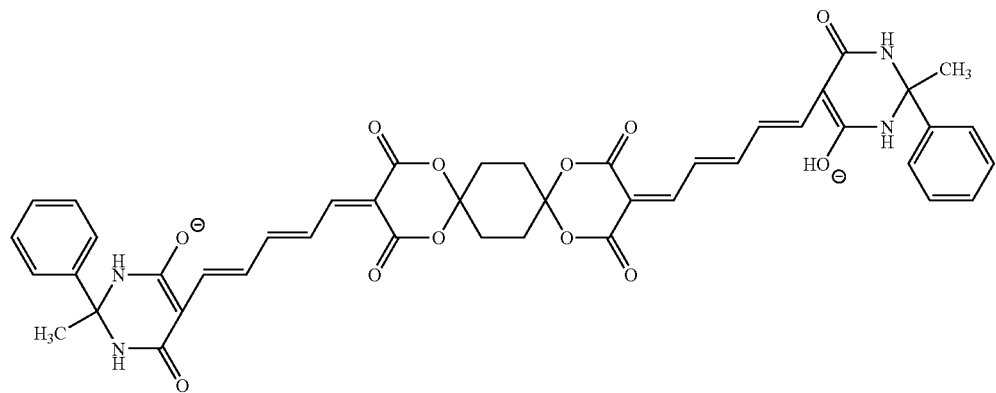
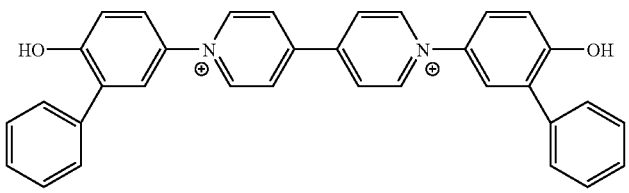
(31)
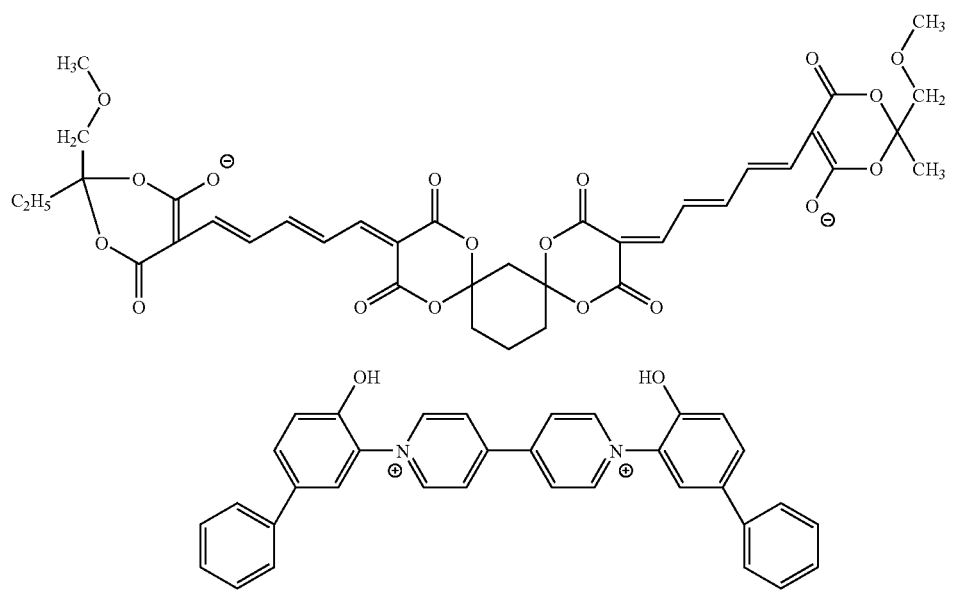

(32)
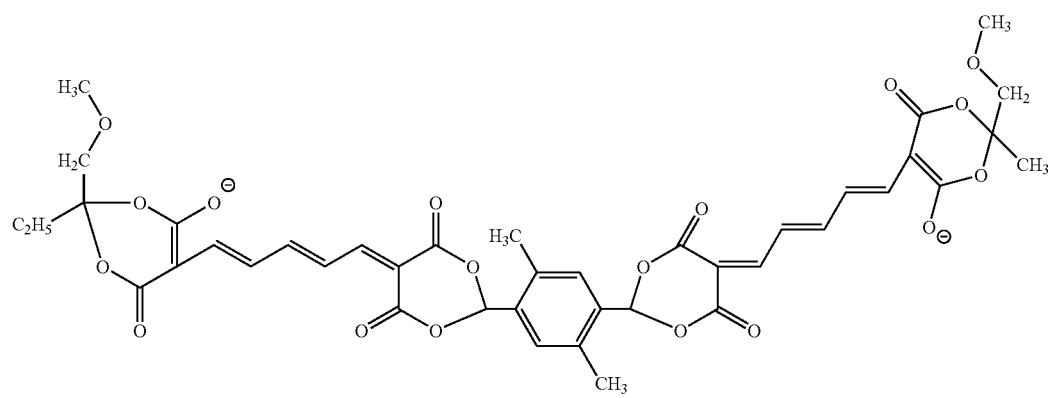
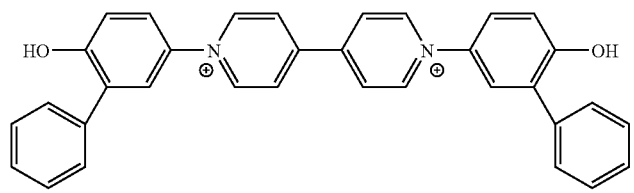
(33)
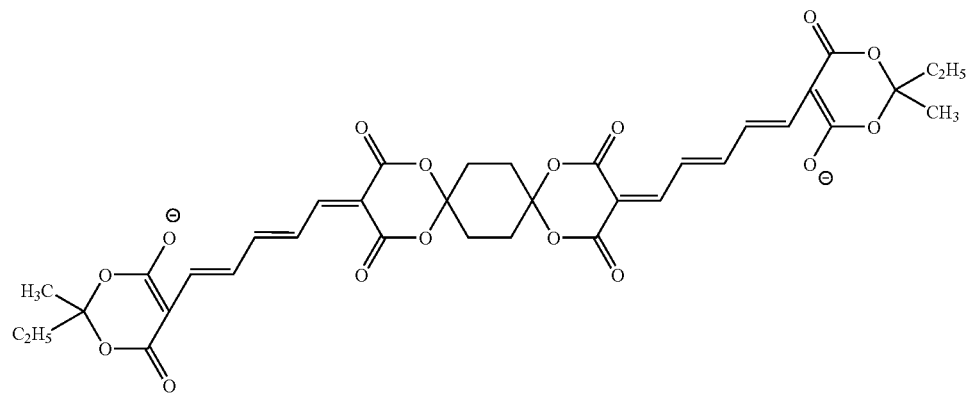
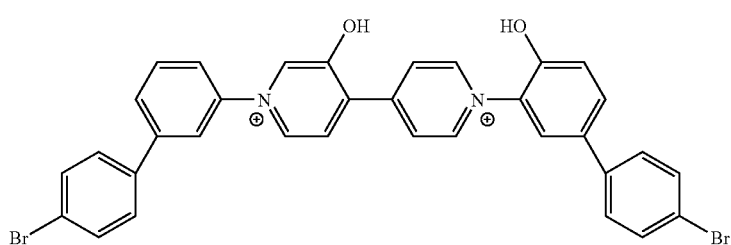

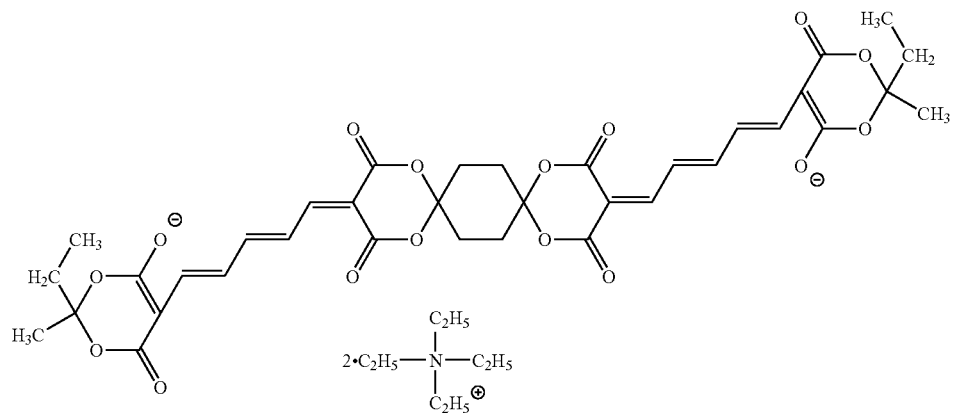
(34)
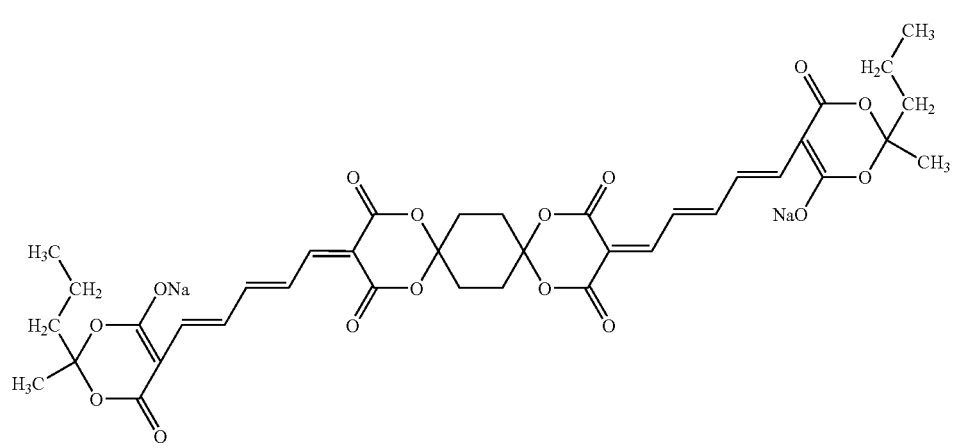
(35)
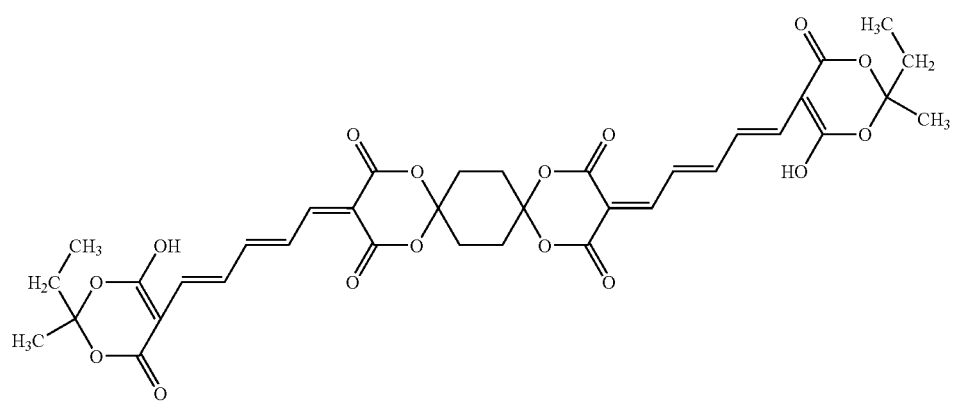
(36)

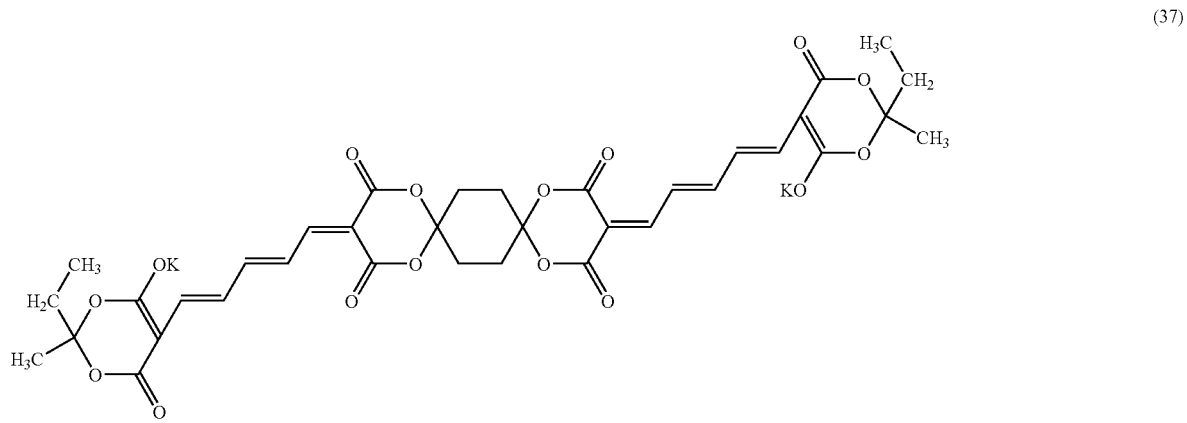

(37)

The general oxonol dye part can be synthesized by condensation reaction between an appropriate active methylene compound and a methine source (a compound used for introducing a methine group into a methine dye). For details of compounds of this kind, JP-A-39-22069, JP-A-43-3504, JP-B-52-38056, JP-B-54-38129, JP-B-55-10059, JP-B-58-35544, JP-A-49-99620, JP-A-52-92716, JP-A-59-16834, JP-A-63-316853, JP-A-64-40827, British Patent No. 1,133,986, and U.S. Pat. Nos. 3,247,127, 4,042,397, 4,181,225, 5,213,956 and 5,260,179 can be referred to.

As the dyes represented by formulae (3) to (5), those disclosed in patent documents, e.g., WO 02/080161A2, JP-A-63-209995 and JP-A-2-62279, can be utilized.

The present dye compounds represented by formula (2) can be synthesized in accordance with the following reaction scheme:

Scheme (1)

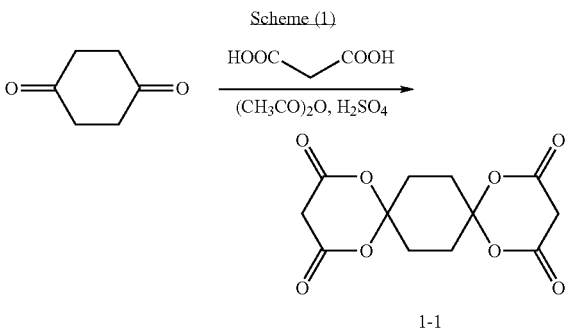

1-1

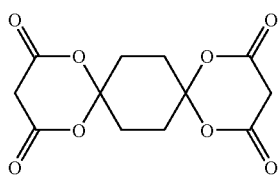

1-I

Scheme (2)

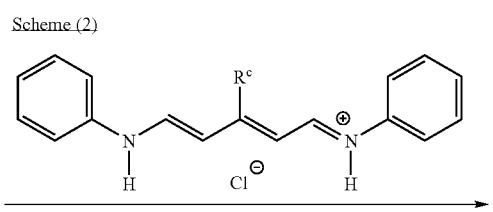

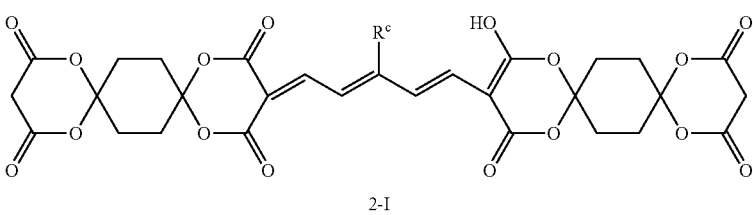

2-I

Scheme (3)

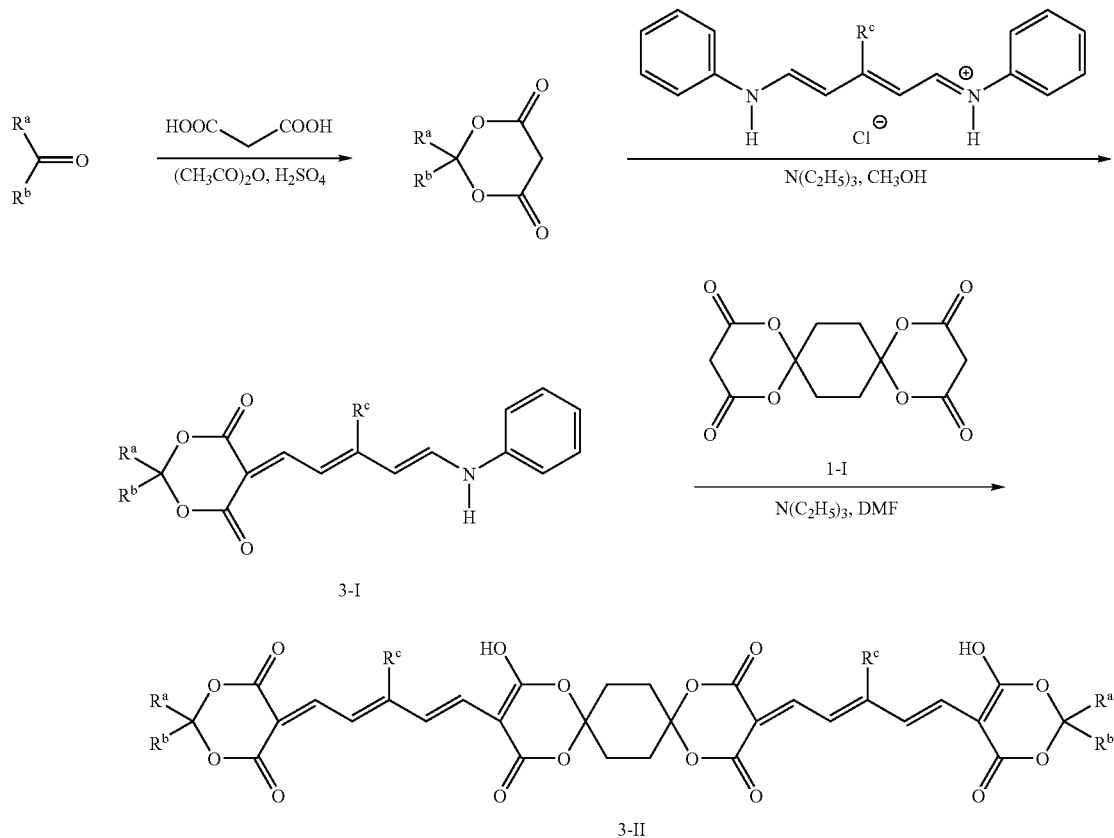

Incidentally, a dye part having a higher number of chromophores than the dye part 3-II can be obtained by using the linkage part 2-I prepared under the scheme (2) in place of Compound 1-I in the reaction between Compound 3-I and Compound 1-I.

The present dye compounds represented by formula (2) may be used alone or as combinations of two or more thereof. In addition, these dye compounds relating to the invention may be used in combination with other dye compounds.

Scheme (4)

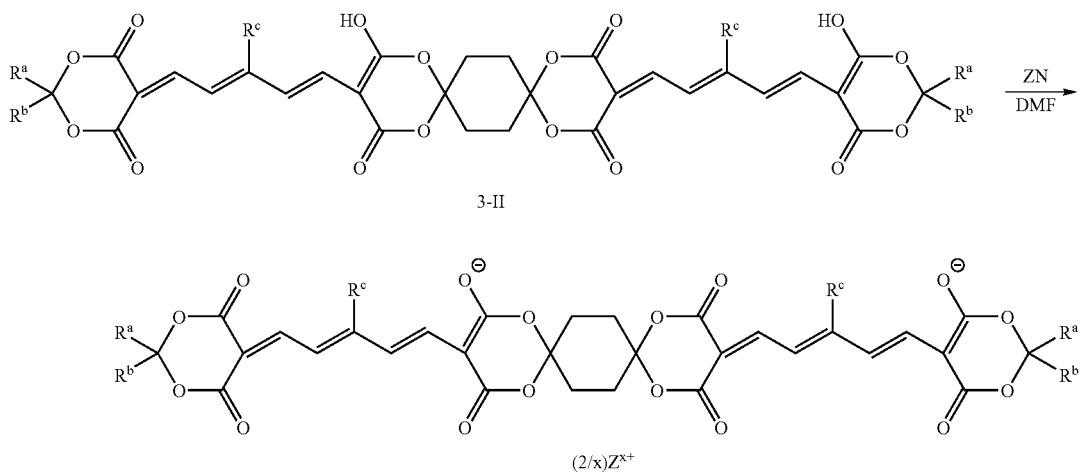

The present information-recording medium is not particularly restricted except that it has a recording layer containing a dye compound represented by formula (2). When it is applied to CD-R, however, the present optical information-recording medium is preferred to have a structure that the recording layer containing a dye compound represented by formula (1), a light reflecting layer and a protective layer are provided in order of mention on a 1.2±0.2 mm-thick transparent disk-shape substrate wherein are formed a pregroove having a track pitch of 1.4 μm to 1.8 μm. On the other hand, when the present recording medium is applied to DVD-R, the following are two preferred embodiments thereof:

(i) An optical information-recording medium made up of two laminates, which each have a recording layer containing a dye compound represented by formula (1) and a light reflecting layer on a 0.6±0.1 mm-thick transparent disk-shape substrate having a pregroove formed with a track pitch of 0.6 to 0.9 μm, bonded together with the recording layers inside so as to have a total thickness of 1.2±0.2 mm.

(ii) An optical information-recording formed by bonding a laminate made up of a 0.6±0.1 mm-thick transparent disk-shape substrate having a pregroove formed with a track pitch of 0.6 to 0.9 μm, a recording layer containing a dye compound represented by formula (1) and a light reflecting layer to a disk-shape protective plate having the same dimensions as the laminate with the recording layer inside so as to have a total thickness of 1.2±0.2 mm. Incidentally, the optical information-recording media of DVD-R type can have structures that protective layers are further provided on the irrespective light reflecting layers.

The present information-recording medium can be produced using, e.g., the methods as described below. The substrate of the present medium (including the protective substrate also) can be arbitrarily selected from various materials hitherto used for substrates of information-recording media. Examples of a substrate material usable herein include glass, polycarbonate, acrylic resins such as polymethyl methacrylate, vinyl chloride resins such as polyvinyl chloride and vinyl chloride copolymers, epoxy resin, amorphous polyolefin and polyester. These materials may be used in combination of two or more thereof, if desired. Incidentally, they may be used in the form of film or rigid plate. Of those materials, polycarbonate is preferred over the others from the viewpoints of moisture resistance, dimensional stability and price.

On the side of the substrate surface where the recording layer is provided, a subbing layer may be coated for the purposes of improvements in flatness and adhesiveness and prevention of deterioration. Examples of a material for forming the subbing layer include macromolecular substances, such as polymethyl methacrylate, acrylic acid-methacrylic acid copolymer, styrene-maleic acid anhydride copolymer, polyvinyl alcohol, N-methylolacrylamide, styrene-vinyltoluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene and polycarbonate; and surface modifiers such as silane coupling agents. In forming the subbing layer, a coating composition is prepared first by dissolving or dispersing a substance as recited above in an appropriate solvent, and then applied to a substrate surface in accordance with a coating method such as spin coating, dip coating or extrusion coating.

Further, a tracking groove or asperity representing information such as address signals (pregroove) is formed on the substrate (or the subbing layer). It is preferable that the pregroove is formed directly on the substrate with the foregoing track pitch at the time of injection or extrusion molding of a resin material such as polycarbonate. Alternatively, the pregroove may be formed by providing a pregroove layer. As a material for the pregroove layer, a mixture of at least one monomer (or oligomer) chosen from monoesters, diesters, triesters or tetraesters of acrylic acid with a photo-polymerization initiator can be used. The pregroove layer can be formed, e.g., in the following manner: Firstly a solution of the foregoing mixture of an acrylic acid ester and a photo-polymerization initiator is coated on a precisely formed matrix (stamper), and then a substrate is mounted on the coating solution layer and irradiated with ultraviolet rays via the substrate or the stamper, thereby curing the coating layer and fixing the substrate to the coating layer. Thereafter, the substrate is peeled from the stamper.

On the pregroove-formed surface of the substrate (or the subbing layer), a recording layer containing the dye as defined in (1), preferably the present dye compound represented by formula (1), is provided.

The recording layer can further contain various types of discoloration inhibitors for the purpose of obtaining an improvement in light resistance. The representatives of discoloration inhibitors usable therein include the metal complexes, the diimmonium salts and the aminium salts represented by formulae (III), (IV) and (V) respectively in JP-A-3-224793, the nitroso compounds disclosed in JP-A-2-300288, and the TCNQ derivatives disclosed in JP-A-10-151861.

The recording layer can be formed by dissolving the present dye and, if needed, a quencher and a binder in a solvent to prepare a coating solution, coating the coating solution on a substrate surface to form a coating layer, and then drying the coating layer. Examples of a sol-vent of the coating solution used for forming the dye recording layer include esters, such as butyl acetate, ethyl lactate and cellosolve acetate; ketones, such as methyl ethyl ketone, cyclohexanone and methyl isobutyl ketone; chlorinated hydrocarbons, such as dichloromethane, 1,2-dichloroethane and chloroform; amides, such as dimethylformamide; hydrocarbons, such as cyclohexane; ethers, such as tetrahydrofuran, ethyl ether and dioxane; alcohol compounds, such as ethanol, n-propanol, isopropanol, n-butanol and diacetone alcohol; fluorine-containing solvents, such as 2,2,3,3-tetrafluoropropanol; and glycol ethers, such as ethylene glycol monomethyl ether, ethylene glycol monoethyl ether and propylene glycol monomethyl ether. These solvents can be used alone or as combinations of two or more thereof with consideration for solubility of compounds to be dissolved therein. To the coating solution, various additives including an antioxidant, a UV absorber, a plasticizer and a lubricant may further be added according to the desired purposes.

Examples of a binder usable in the recording layer include naturally occurring organic macromolecular substances, such as gelatin, cellulose derivatives, dextran, rosin and rubber; and synthetic organic polymers, such as hydrocarbon resins (e.g., polyethylene, polypropylene, polystyrene, polyisobutylene), vinyl resins (e.g., polyvinyl chloride, polyvinylidene chloride, vinyl chloride-vinyl acetate copolymer), acrylic resins (e.g., polymethyl acrylate, polymethyl methacrylate), polyvinyl alcohol, chlorinated polyethylene, epoxy resin, butyral resin, rubber derivatives, and initial condensation products of thermosetting resins such as phenol-formaldehyde resin. When such a binder is used as a constituent material of the recording layer in combination with the present dye, the amount of the binder used is generally from 0.01 to 50 times (by weight), preferably from 0.1 to 5 times (by weight), that of the dye used. The dye concentration in the thus prepared coating solution is generally from 0.01 to 10 weight %, preferably from 0.1 to 5 weight %.

Examples of a coating method applicable herein include a spray method, a spin coating method, a dip method, a roll coating method, a blade coating method, a doctor roll method and a screen printing method. The recording layer may be a single layer or a double layer. The thickness of the recording layer is generally from 20 to 500 nm, preferably from 50 to 300 nm.

On the recording layer, a reflective layer is provided for the purpose of improving the reflectivity at the time of information reproduction. The light-reflecting substance as a constituent material of the reflective layer is a substance having a high laser-light reflectivity, with examples including metals or semimetals, such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi; and stainless steel. Of these substances, Cr, Ni, Pt, Cu, Ag, Au, Al and stainless steel are preferred over the others, and Ag in particular is advantageous. These substances may be used alone, or as combinations or alloys of two or more thereof. The reflective layer can be formed on the recording layer by vapor deposition, sputtering or ion-plating of a reflective substance as recited above. The thickness of the reflective layer is generally from 10 to 300 nm, preferably from 50 to 200 nm.

On the reflective layer, a protective layer may be provided for the purpose of protecting the recording layer from physical and chemical damages. For the purpose of enhancing scratch resistance and moisture resistance, such a protective layer may also be provided on the side of the substrate where the recording layer is not provided. Examples of a substance usable for the protective layer include inorganic substances, such as SiO, $SiO_2$, $MgF_2$, $SnO_2$ and $Si_3N_4$; and organic substances, such as thermoplastic resins, thermosetting resins and UV-curable resins. The protective layer can be formed by laminating a substance as recited above on the reflective layer and/or the substrate via an adhesive layer such as a film obtained by extrusion of plastic. Alternatively, the protective layer may be formed using a vacuum deposition, sputtering or coating method. In the case of using a thermoplastic resin or a thermosetting resin, the protective layer can be formed by dissolving the resin in an appropriate solvent to prepare a coating solution, coating the coating solution and then drying the solution coated. In the case of a UV-curable resin, the protective layer is formed by coating the resin as it is or a solution prepared by dissolving the resin in an appropriate solvent, and then irradiating the coating with UV rays to cure the resin. To those coating solutions, various additives, such as an antistatic agent, an antioxidant and a UV absorber, may further be added according to the desired purposes. The thickness of the protective layer is generally from 0.1 to 100 μm. Through the process mentioned above, a laminate having on the substrate the recording layer, the reflective layer and, if needed, the protective layer can be formed. And a DVD-R information-recording medium having two recording layers can be produced by forming two laminates through the foregoing process and bonding them together with their respective recording layers inside. In addition, a DVD-R information-recording medium having the recording layer on one side alone can be produced by bonding one laminate formed through the above process to a disk-shape protective substrate having the same dimensions as the substrate of the laminate with the recording layer inside.

In the invention, recording of information on the thus produced information-recording media is performed, e.g., in the following manner. While rotating an information-recording medium at a constant linear velocity or a constant angular velocity, laser light for recording, such as semiconductor laser light, is applied to the information-recording medium from the substrate side. By this exposure to laser light, it is thought that cavities are formed at the interface between the recording layer and the reflective layer (the cavity formation occurs as the recording layer or the reflective layer, or both of them undergo deformation), or swelling deformations are caused in the substrate, or discoloration or change of association state is caused in the recording layer, and thereby changes in refractive index are achieved to result in recording of information. As the recording light, semiconductor laser beams having oscillation wavelengths in the range of 770 to 790 nm are used in the case of CD-R type of recording media, and those having oscillation wavelengths in the range of 600 to 700 nm (preferably 620 to 680 nm, far preferably 630 to 660 nm) are used in the case of DVD-R type of recording media. The information thus recorded can be reproduced by irradiating the substrate side of the information-recording medium with semiconductor laser light having the same wavelength as the light used at the time of recording while rotating the recording medium at the same constant linear velocity as set for the recording, and detecting the light reflected from the recording medium.

EXAMPLES

Example 1

Synthesis of Compound (3):

The present compound was synthesized in accordance with the reaction scheme illustrated hereinbefore.

[Synthesis of Linkage Part (Compound (1-I))]

1,4-Cyclohexanedione (22.43 g, 0.2 mol) and malonic acid (41.62 g, 0.4 mol) were dissolved in acetic anhydride (85 ml), and thereto concentrated sulfuric acid (7.0 ml, 0.12 mol) was added. The resulting admixture was stirred in an ice bath. As the reaction progressed, light brown crystals separated out. These crystals were filtered off, washed with ice-cold distilled water, and dried. Thus, 8.8 g of the intended Compound (1-I) was obtained as light brown crystals (in a 15.5% yield.

[Synthesis of Dye Part (Compound (3-II))]

Malonic acid (5.2 g, 0.05 mol) and concentrated sulfuric acid (0.5 ml) were added to acetic anhydride (10 ml), and therein the source compound was dissolved thoroughly while stirring at room temperature. Thereto, 4-ethylcyclohexanone (6.31 g, 0.05 mol) was slowly added dropwise while cooling in an ice bath. The stirring of the admixture was continued in an ice bath, and colorless crystals separated out as the reaction progressed. These crystals were filtered off, washed with distilled water, and dried. Thus, 9.0 g of a meldrum's acid derivative was obtained as colorless crystals (in a 85.1% yield). The thus obtained meldrum's acid derivative (4.25 g, 0.02 mol) and N,N'-1,3-pentadiene-1-yl-5-ylidenedianiline hydrochloride (5.70 g, 0.02 mol) were dissolved in methanol (50 ml), and thereto triethylamine (3.04 g, 0.03 mol) was added. The stirring of the resulting admixture was continued at room temperature to result in deposition of violet crystals. Then, these crystals were filtered off, and washed with methanol. Thus, 5.61 g of violet crystals corresponding to Compound (3-I) was obtained (in a 76.3% yield). These violet crystals (4.40 g, 12.0 mmol) and the Compound (1-I) obtained in the foregoing Synthesis (1.71 g, 6.0 mmol) were dissolved in dimethylformamide (20 ml), and thereto triethylamine (1.82 g, 18 mmol) was added dropwise. The resulting admixture was stirred for 4 hours at 50° C. Thereafter, the reaction solution obtained was admixed with distilled water, and extracted with ethyl acetate. The organic layer thus extracted was purified by column chromatography (dichloromethane/methanol=6/1) on silica gel to give 2.0 g of violet powder corresponding to Compound (3-II) (in a 39.5% yield).

[Synthesis of Dye Compound]

The violet powder (1.24 g, 1.48 mmol) obtained in the foregoing Synthesis was dissolved into dimethylformamide in a minimum amount required for dissolution, and thereto Compound C used as a counter cation was added at room temperature with stirring. The stirring was continued to result in deposition of gold powder. So the gold powder was filtered off, thereby giving 0.95 g of the desired Compound (3) as gold (in a 48.3% yield).

The molecular structure of the thus obtained gold powder was confirmed by $^1$H-NMR.

$^1$H-NMR (DMSO-d6): 0.84(t, 6H), 1.20(m. 10H), 1.62 (m. 8H), 1.96–2.14(m, 12H), 7.11(m. 4H), 7.24(d, 2H), 7.34–7.77(m, 18H), 7.90(d, 2H), 9.00(d, 4H), 9.65(d, 4H), 10.71(s, 2H)

Example 2

Syntheses of Compounds (1), (13) and (14):

Synthesis was carried out under the same reaction scheme as the synthesis of Compound (3) in Example 1, except for the scheme (3) wherein cyclohexanone was used in place of 4-ethylcyclohexanone; as a result, the purification by column chromatography on silica gel in the scheme (3) effected resolution into the compound corresponding to the dye anion of Compound (1) and the compound corresponding to the dye anion common to Compounds (13) and (14). And in the scheme (4), the thus resolved compounds corresponding to the dye anions were converted into their respective salts, thereby giving the desired Compound (1), Compound (13) and Compound (14).

$^1$H-NMR (DMSO-d6) of Compound (1): 1.40(s, 4H), 1.54(s, 8H), 1.83(s, 8H), 1.98(s, 8H), 7.09–7.79(m, 24H), 7.92(s, 2H), 9.00(s, 4H), 9.69(s, 4H) $^1$H-NMR (DMSO-d6) of Compounds (13): 1.41(s, 4H), 1.53(s, 8H), 1.82 (s, 8H), 1.98(s, 24H), 7.13(t, 8H), 7.27(d, 4H), 7.38–7.79(m, 40H), 7.91(s, 4H), 9.01(d, 8H), 9.67(d, 8H), 10.74(s, 4H)

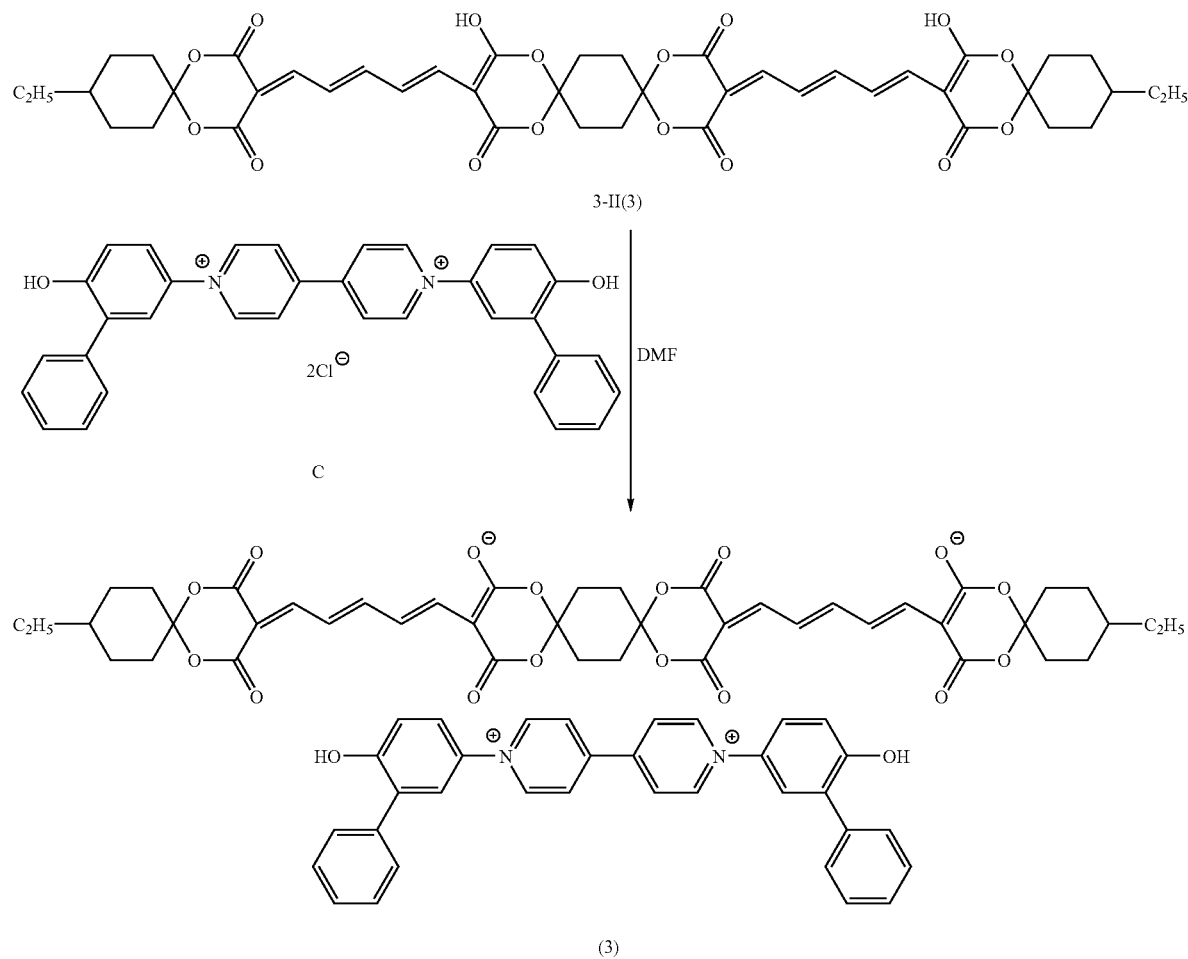

Example 3

Synthesis of Compound (2):

Compound (2) was synthesized under the same reaction scheme as Compound (3) in Example 1, except that 4-methylcyclohexanone was used in place of 4-ethylcyclohexanone.

$^1$H-NMR (DMSO-d6): 0.91(d, 6H), 1.20(q, 4H), 1.47(s, 2H), 1.65(m, 8H), 2.01(m, 12H), 7.10(q, 4H), 7.28(d, 2H), 7.39–7.86(m, 18H), 7.89(s, 2H), 9.01(d, 4H), 9.67(d, 4H), 10.71(s, 2H)

Example 4

Synthesis of Compound (4):

Compound (4) was synthesized under the same reaction scheme as Compound (3) in Example 1, except that menthone was used in place of 4-ethylcyclohexanone.

$^1$H-NMR (DMSO-d6): 0.81(t, 12H), 0.90(d, 8H), 1.21(t, 2H), 1.41(s, 4H), 1.61(t, 4H), 1.72(d, 2H), 1.97(s, 8H), 2.18(d, 4H), 7.12(q, 4H), 7.24(d, 2H), 7.38–7.78(m, 18H), 7.90(s, 2H), 9.01(d, 4H), 9.68(d, 4H), 10.7(s, 2H)

Example 5

Synthesis of Compound (5):

Compound (5) was synthesized under the same reaction scheme as Compound (3) in Example 1, except that 3,3,5-trimethylcyclohexanone was used in place of 4-ethylcyclohexanone.

$^1$H-NMR (DMSO-d6): 0.89(t, 12H), 0.97(s, 6H), 1.19(t, 2H), 1.40(m, 4H), 1.89–1.98(m, 16H), 7.11(m, 4H), 7.26(d, 2H), 7.40(d, 2H), 7.49(m, 6H), 7.60(t, 4H), 7.70(m, 6H), 7.90(s, 2H), 9.00(s, 4H), 9.67(s, 4H), 10.72(s, 2H)

Example 6

Synthesis of Compound (6):

Compound (6) was synthesized under the same reaction scheme as Compound (3) in Example 1, except that methyl ethyl ketone was used in place of 4-ethylcyclohexanone.

$^1$H-NMR (DMSO-d6): 0.95(t, 6H), 1.53(s, 6H), 1.81(t, 4H), 1.99(s, 8H), 7.11(q, 4H), 7.26(d, 2H), 7.39–7.77(m, 18H), 7.89(s, 2H), 9.00(d, 4H), 9.67(d, 4H), 10.69(s, 2H)

Example 7

Synthesis of Compound (7):

Compound (7) was synthesized under the same reaction scheme as Compound (3) in Example 1, except that 3,3-dimethyl-2-butanone was used in place of 4-ethylcyclohexanone.

$^1$H-NMR (DMSO-d6): 1.10(s, 18H), 1.51(s, 6H), 1.98(s, 8H), 7.14(q, 4H), 7.28(d, 2H), 7.38–7.78(m, 18H), 7.90(s, 2H), 9.01(d, 4H), 9.79(d, 4H), 10.71(s, 2H)

Example 8

Synthesis of Compound (8):

Compound (8) was synthesized under the same reaction scheme as Compound (3) in Example 1, except that 2-methyl-3-pentanone was used in place of 4-ethylcyclohexanone.

$^1$H-NMR (DMSO-d6): 0.90(m, 18H), 1.83(q, 4H), 2.00(s, 8H), 2.15(m, 2H), 7.11(q, 4H), 7.26(d, 2H), 7.38–7.75(m, 18H), 7.90(s, 2H), 9.01(d, 4H), 9.68(d, 4H), 10.70(s, 2H)

Example 9

Synthesis of Compound (9):

Compound (9) was synthesized under the same reaction scheme as Compound (3) in Example 1, except that diethyl ketone was used in place of 4-ethylcyclohexanone.

$^1$H-NMR (DMSO-d6): 0.85(t, 12H), 1.84(q, 8H), 2.00(s, 8H), 7.11(q, 4H), 7.26(d, 2H), 7.32–7.78(m, 18H), 7.89(s, 2H), 9.00(d, 4H), 9.66(d, 2H), 10.701(s, 2H)

Example 10

Synthesis of Compound (10):

Compound (10) was synthesized under the same reaction scheme as Compound (3) in Example 1, except that 2-pentanone was used in place of 4-ethylcyclohexanone.

$^1$H-NMR (DMSO-d6): 0.90(t, 6H), 1.39(m, 4H), 1.45(s, 6H), 1.77(m, 4H), 1.98(s, 8H), 7.10(q, 4H), 7.27(d, 2H), 7.40–7.80(m, 18H), 7.91(s, 2H), 9.05(d, 4H), 9.65(d, 4H), 10.72(s, 2H)

Example 11

Synthesis of Compound (11):

Compound (11) was synthesized under the same reaction scheme as Compound (3) in Example 1, except that 3-methylcyclohexanone was used in place of 4-ethylcyclohexanone.

$^1$H-NMR (DMSO-d6): 0.98(m, 8H), 1.28(t, 2H), 1.50–1.65(m, 10H), 1.96–2.08(m, 12H), 7.11(m, 4H), 7.25(d, 2H), 7.38–7.73(m, 18H), 7.90(s, 2H), 9.00(s, 4H), 9.66(s, 4H), 10.70(s, 2H)

Example 12

Synthesis of Compound (12):

Compound (12) was synthesized under the same reaction scheme as Compound (3) in Example 1, except that cyclohexanone was used in place of 4-ethylcyclohexanone and 3-methyl-N,N'-1,5-heptadiene-1-yl-7-ylidenedianiline hydrochloride was used in place of N,N'-1,3-pentadiene-1-yl-5-ylidenedianiline hydrochloride.

$^1$H-NMR (DMSO-d6): 1.41(s, 4H), 1.58(s, 8H), 1.82(s, 8H), 1.99(s, 8H), 1.99(s, 8H), 2.17(s, 6H), 7.24–7.48(m, 12H), 7.69–7.99(m, 12H), 9.00(s, 4H), 9.68(s, 4H), 10.71(s, 2H)

Example 13

Evaluation of Optical Constant:

Optical characteristic values of the present dye compounds each (the real part n and the imaginary part k of a complex refractive index) were evaluated by reflex spectroscopic ellipsometry. As each sample for making evaluations of optical characteristics by use of the spectroscopic ellipsometry, a spin coating film formed on a glass substrate was adopted. This spin coating film was formed by dissolving each dye compound into 2,2,3,3-tetrafluoropropanol so that the solution concentration reached 25 mM and casting this solution on a spinning glass substrate.

[Formation of Spin Coaing Film containing Comparative Compound (1)]

As a comparative example, a spin coating film was formed from a comparative compound (1) having the following structure and ensuring satisfactory recording characteristics in the recording at equivalent speed.

Comparative Compound (1):

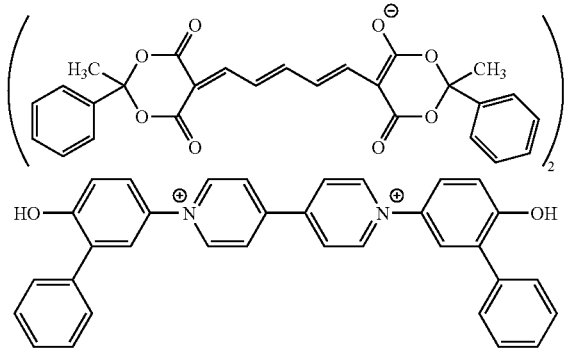

Optical characteristics of the spin coating films formed from the present Compounds (1) and (3) to (14) respectively were evaluated, and n and k values at 660 nm were determined from the evaluation results obtained. These values are shown in Table 1.

TABLE 1

| Compound | n | k |
| --- | --- | --- |
| Compound (1) | 2.24 | 0.055 |
| Compound (3) | 2.23 | 0.054 |
| Compound (4) | 2.20 | 0.040 |
| Compound (5) | 2.20 | 0.038 |
| Compound (6) | 2.27 | 0.040 |
| Compound (7) | 2.22 | 0.041 |
| Compound (8) | 2.24 | 0.040 |
| Compound (9) | 2.25 | 0.047 |
| Compound (10) | 2.26 | 0.051 |
| Compound (11) | 2.21 | 0.035 |
| Compound (12) | 2.21 | 0.051 |
| Compound (13) | 2.40 | 0.056 |
| Compound (14) | 2.30 | 0.050 |
| Comparative Compound (1) | 2.08 | 0.051 |

In the next place, examples of an optical information-recording medium are shown.

Example 14

[Preparation of Optical Recording Medium]

By extrusion molding, polycarbonate resin was formed into a 0.6 mm-thick, 120 mm-dia substrate having a spiral groove (depth: 130 nm, width: 310 nm, track pitch: 0.74 μm).

The present Compound (6) in an amount of 1.25 g was dissolved into 100 ml of 2,2,3,3-tetrafluoropropanol to prepare a coating solution. This coating solution was coated on the pregroove-formed surface of the substrate by use of a spin coating method, thereby forming a dye layer.

Onto the dye-coated surface, silver was sputtered to form a reflective layer having a thickness of about 150 nm. And the reflective layer thus formed was bonded to a 0.6 mm-thick dummy substrate by use of a UV-curable resin (Daicureclear SD640, produced by DAINIPPON INK AND CHEMICALS, INCORPORATED), thereby forming a disc.

Comparative Example 1

A disc was formed in the same manner as in Example 14, except that the Comparative Compound (1) illustrated above was used in place of the present Compound (6).

Comparative Example 2

A disc was formed in the same manner as in Example 14, except that a 6:4 mixture of the Comparative Compound (1) and the following Comparative Compound (2) was used in place of the present Compound (6).

[Evaluations of Optical Recording Medium]

By use of DDU-1000 and a multisignal generator (made by Pulstec Industrial Co., Ltd.; laser wavelength: 660 nm, aperture rate: 0.60), 8–16 modulating signals were recorded at each of equivalent-speed (11.08 Mbps), octuple-speed (88.64 Mbps) and decuple-speed (110.8 Mbps) transfer rates.

The recording strategies used are shown in Table 2 and FIG. 1. The equivalent-speed recording and the decuple-speed recording were each performed using one kind of recording strategy, while the octuple-speed recording was performed using two kinds of recording strategies greatly different in pulse width.

The recording power was set so as to minimize the amount of jitter in recording on each medium. Thereafter, the signals recorded were reproduced with laser of the same wavelength as that used for recording, and therein the amount of jitter was measured. The results obtained are shown in Table 3.

The optical recording media prepared in Example 14 had low jitter in all the equivalent-speed, octuple-speed and decuple-speed reproductions as well as high reflectivities, compared with those prepared in Comparative Examples. With respect to the 8× recording characteristics, the medium prepared in Example 14 achieved satisfactory jitter under each of the recording strategies greatly different in pulse width, compared with the media prepared in Comparative Examples.

Further, when the single-frequency of 3T and 14T is recorded corresponding to duodetuple-speed and hexadetuple-speed, the C/N ratio, modulation and jitter which are equivalent to those of equivalent-speed to decuple-speed were obtained. This fact means that the preferable characteristics are obtained in a case of the recording speed of at least decuple-speed to hexadetuple-speed or hexadetuple-speed or more.

TABLE 2

| | Recording Strategies | | | |
| --- | --- | --- | --- | --- |
| | Recording Speed | | | |
| | 1X | 8X | 8X | 10X |
| Recording Strategy | A | B | C | D |
| 3Ttop | 1.55 | 2.55 | 1.85 | 2.75 |
| 4Ttop | 1.50 | 2.92 | 2.12 | 3.20 |
| nTtop | 1.55 | 1.70 | 1.30 | 1.90 |
| Tmp | 0.65 | — | — | — |
| nTwt | — | 0.50 | −0.30 | 0.55 |
| nTlp | — | 1.40 | 0.60 | 1.40 |
| 3-nTld | — | −0.03 | −0.05 | −0.03 |

TABLE 2-continued

Recording Strategies

| Recording Strategy | Recording Speed | | | |
|---|---|---|---|---|
| | 1X A | 8X B | 8X C | 10X D |
| 3Tdtop | — | −0.15 | −0.05 | −0.15 |
| 4Tdtop | — | 0.20 | 0.35 | 0.20 |
| nTdtop | — | 0.00 | 0.00 | 0.00 |
| 5Ttop2 | — | −0.15 | −0.05 | −0.20 |
| 5Tlp2 | — | −0.10 | −0.15 | −0.20 |
| 5Tdlp2 | — | 0.00 | 0.00 | 0.00 |
| P0/Pm | — | 1.48 | 1.58 | 1.36 |

TABLE 3

Evaluation Results of Recording Characteristics

| | Example 14 | | | | Comparative Example 1 | | | | Comparative Example 2 | | | |
|---|---|---|---|---|---|---|---|---|---|---|---|---|
| Recording speed | 1× | 8× | 8× | 10× | 1× | 8× | 8× | 10× | 1× | 8× | 8× | 10× |
| Recording strategy | A | B | C | D | A | B | c | D | A | B | c | D |
| Optimum recording power (mW) | 11 | 28.5 | 36.3 | 33.5 | 12 | 29.0 | 39.0 | 34.0 | 7.9 | 25.5 | 29.5 | 29.2 |
| Reflectivity (%) | 53.2 | 51.8 | 52.0 | 50.9 | 50 | 49.1 | 49.0 | 48.6 | 44.5 | 46.5 | 44.8 | 44.4 |
| Jitter (%) | 6.1 | 6.2 | 6.0 | 7.2 | 9.0 | 13.2 | 12.0 | 15.0 | 8 | 13.9 | 6.8 | 9.0 |
| 14T modulation factor | 0.54 | 0.71 | 0.77 | 0.76 | 0.50 | 0.72 | 0.76 | 0.77 | 0.50 | 0.73 | 0.78 | 0.77 |
| PI error | 80 | 18 | 11 | 15 | 94 | 40 | impossible to measure | impossible to measure | 94 | impossible to measure | 90 | 120 |
| AR (%) | 50 | 32 | 28 | 25 | 48 | 30 | 32 | 25 | 48 | 28 | 28 | 26 |

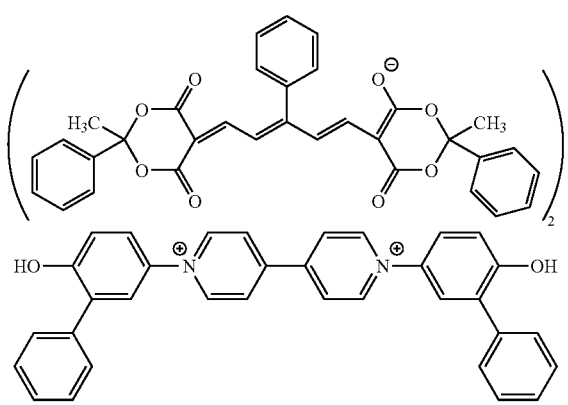

Comparative Compound (2)

Example 15

Optical discs (Sample Nos. 202 to 213) were prepared in the same manner as the optical disc prepared in Example 14 (Sample No. 201), except that the dye Compound (6) was replaced by the present dye Compounds (7), (8), (9), (10), (15), (16), (17), (19), (21) and (22), Comparative Compound (1) and mixture of Comparative Compounds (1) and (2), respectively, as set forth in Table 4. And record-playback performances were evaluated by the same method as in Example 14. The evaluation results thus obtained are shown in Table 4. It can be seen from Table 4 that the present dyes ensured higher reflectivity and lower jitter than the comparative compounds as well as satisfactory modulation factor.

TABLE 4

| Sample No. | Dye | Reflectivity (%) | Jitter | 14I Modulation Factor | note |
|---|---|---|---|---|---|
| 201 | Compound (6) | 50.9 | 7.2 | 0.76 | invention (Example 14) |
| 202 | Compound (7) | 52.0 | 8.2 | 0.78 | invention |
| 203 | Compound (8) | 51.2 | 8.1 | 0.77 | invention |

TABLE 4-continued

| Sample No. | Dye | Reflectivity (%) | Jitter | 14I Modulation Factor | note |
|---|---|---|---|---|---|
| 204 | Compound (9) | 52.2 | 7.9 | 0.77 | invention |
| 205 | Compound (10) | 52.4 | 8.1 | 0.78 | invention |
| 206 | Compound (15) | 53.1 | 7.8 | 0.77 | invention |
| 207 | Compound (16) | 52.1 | 7.9 | 0.76 | invention |
| 208 | Compound (17) | 53.9 | 8.4 | 0.75 | invention |
| 209 | Compound (19) | 52.8 | 7.6 | 0.76 | invention |
| 210 | Compound (21) | 52.1 | 6.8 | 0.78 | invention |
| 211 | Compound (22) | 51.6 | 8.1 | 0.78 | invention |
| 212 | Comparative Compound (1) | 48.6 | 15.0 | 0.77 | comparison |
| 213 | Mixture of Comparative Compounds (1) and (2) | 44.4 | 9.0 | 0.77 | comparison |

The invention can provide dyes having complex refractive indexes great in the real part n and equivalent or small in the imaginary part k, compared with those of comparative dyes for low-speed recording use, and can offer an optical information-recording medium excellent recording characteristics whether the recording speed is low or high.

The entire disclosure of each and every foreign patent application from which the benefit of foreign priority has been claimed in the present application is incorporated herein by reference, as if fully set forth.

What is claimed is:

1. An optical information-recording medium, comprising a dye having at least two chromophores bonded to each other without any conjugated bond intervening between said chromophores wherein the dye is represented by the following formula (2):

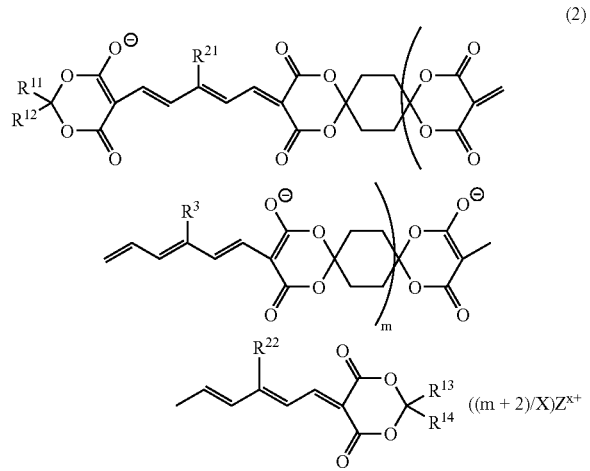

wherein $R^{11}$, $R^{12}$, $R^{13}$ and $R^{14}$ each independently represents a hydrogen atom, a substituted or unsubstituted alkyl group, a substituted or unsubstituted aryl group or a substituted or unsubstituted heterocyclic group, $R^{21}$, $R^{22}$ and $R^3$ each independently represents a hydrogen atom, a substituted or unsubstituted alkyl group, a substituted or unsubstituted alkoxy group, a substituted or unsubstituted alkyl group, a substituted or unsubstituted aryloxy group, a substituted or unsubstituted heterocyclic group, a halogen atom, a carboxyl group, a substituted or unsubstituted alkoxycarbonyl group, a cyano group, a substituted or unsubstituted acyl group, a substituted or unsubstituted carbamoyl group, an amino group, a substituted amino group, a sulfo group, a hydroxyl group, a nitro group, a substituted or unsubstituted alkylsulfonylamino group, a substituted or unsubstituted arylsulfonylamino group, a substituted or unsubstituted carbamoylamino group, a substituted or unsubstituted alkylsulfonyl group, a substituted or unsubstituted arylsulfonyl group, a substituted or unsubstituted alkylsulfinyl group, a substituted or unsubstituted arylsulfinyl group or a substituted or unsubstituted sulfamoyl group, m represents an integer of 0 or more, $R^3$s may be the same or different when m is 2 or more, $Z^{x+}$ represents a cation, and x represents an integer of 1 or more.

2. An optical information-recording medium as described in claim 1, having a thickness of 1,2±0.2 mm and comprising two laminates each containing a recording layer including the dye, in which the two laminates are bonded each other so that each of the recording layers is inside,
wherein each of the laminates includes:
a transparent disk-shape substrate having a pregroove formed with a track pitch of 0.6 to 0.9 μm and measuring one of 120±3 mm and 80±3 mm in diameter and 0.6±0.1 mm in thickness; and
the recording layer provided on the pregroove-formed side of the transparent disk-shape substrate.

3. A method of recording information comprising recording information on an optical information-recording medium as described in claim 2 by irradiation with laser light having a wavelength of 600 to 700 nm.

4. An optical information-recording medium as described in claim 1, having a thickness of 1.2±0.2 mm,
the optical information-recording medium comprising:
a laminate containing a recording layer including the dye; and
a disk-shape protective plate;
in which the laminate and the disk-shape protective plate are bonded each other so that the recording layer is inside,
wherein the laminate includes:
a transparent disk-shape substrate having a pregroove formed with a track pitch of 0.6 to 0.9 μm and measuring one of 120±3 mm and 80±3 mm in diameter and 0.6±0.1 mm in thickness; and
the recording layer provided on the pregroove-formed side of the transparent disk-shape substrate.

5. A method of recording information comprising recording information on an optical information-recording medium as described in claim 4 by irradiation with laser light having a wavelength of 600 to 700 nm.

6. A method of recording information comprising recording information on an optical information-recording medium as described in claim 1 by irradiation with laser light having a wavelength of 600 to 700 nm.

7. An oxonol compound represented by the following formula (2):

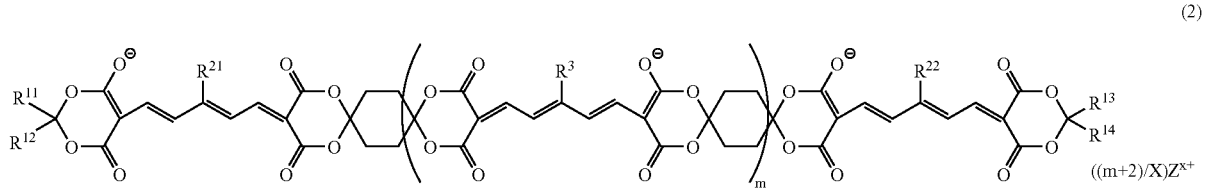

wherein $R^{11}$, $R^{12}$, $R^{13}$ and $R^{14}$ each independently represents a hydrogen atom, a substituted or unsubstituted alkyl group, a substituted or unsubstituted aryl group or a substituted or unsubstituted heterocyclic group, $R^{21}$, $R^{22}$ and $R^3$ each independently represents a hydrogen atom, a substituted or unsubstituted alkyl group, a substituted or unsubstituted alkoxy group, a substituted or unsubstituted aryl group, a substituted or unsubstituted aryloxy group, a substituted or unsubstituted heterocyclic group, a halogen atom, a carboxyl group, a substituted or unsubstituted alkoxycarbonyl group, a cyano group, a substituted or unsubstituted acyl group, a substituted or unsubstituted carbamoyl group, an amino group, a substituted amino group, a sulfo group, a hydroxyl group, a nitro group, a substituted or unsubstituted alkylsulfonylamino group, a substituted or unsubstituted arylsulfonylamino group, a substituted or unsubstituted carbamoylamino group, a substituted or unsubstituted alkylsulfonyl group, a substituted or unsubstituted arylsulfonyl group, a substituted or unsubstituted alkylsulfinyl group, a substituted or unsubstituted arylsulfinyl group or a substituted or unsubstituted sulfamoyl group, m represents an integer of 0 or more, $R^3$s may be the same or different when m is 2 or more, $Z^{x+}$ represents a cation, and x represents an integer of 1 or more.

* * * * *